United States Patent
Müller et al.

[11] Patent Number: 5,931,975
[45] Date of Patent: Aug. 3, 1999

[54] DYES, PROCESSES FOR THEIR PREPARATION AND THEIR USE

[75] Inventors: Bernhard Müller, Efringen-Kirchen; Patric Nowack, Lörrach, both of Germany

[73] Assignee: Ciba Specialty Chemicals Corporation, Tarrytown, N.Y.

[21] Appl. No.: 08/951,865

[22] Filed: Oct. 16, 1997

Related U.S. Application Data

[63] Continuation of application No. 08/662,097, Jun. 12, 1996, abandoned.

[30] Foreign Application Priority Data

Jun. 14, 1995 [CH] Switzerland ................ 7-1766

[51] Int. Cl.$^6$ ............... D06P 3/10; D06P 3/66; C09B 62/04; C09B 62/44
[52] U.S. Cl. ............ 8/549; 8/638; 8/639; 8/641; 8/661; 8/917; 8/918; 8/924; 544/187; 544/204; 544/208; 544/209; 544/210; 544/217; 540/126; 534/634; 534/635; 534/637; 534/638; 534/618; 552/218; 552/219
[58] Field of Search ............ 8/549, 638–641, 8/918–924; 534/634, 635, 637; 544/76; 552/218, 219

[56] References Cited

U.S. PATENT DOCUMENTS

| | | | |
|---|---|---|---|
| 4,502,866 | 3/1985 | Brenneisen et al. | 8/549 |
| 5,122,605 | 6/1992 | Pedrazzi | 544/76 |
| 5,223,000 | 6/1993 | Lauk | 8/638 |
| 5,393,306 | 2/1995 | Tzikas et al. | 8/543 |
| 5,395,925 | 3/1995 | Koch et al. | 534/634 |
| 5,525,124 | 6/1996 | Landré et al. | 8/532 |

FOREIGN PATENT DOCUMENTS

| | | |
|---|---|---|
| 0581732 | 2/1994 | European Pat. Off. |
| 0693538 | 1/1996 | European Pat. Off. |
| 93/18224 | 9/1993 | WIPO |
| 9318224 | 9/1993 | WIPO |

*Primary Examiner*—Margaret Einsmann
*Attorney, Agent, or Firm*—Jacob M. Levine; David R. Crichton

[57] ABSTRACT

Dyes of the formula

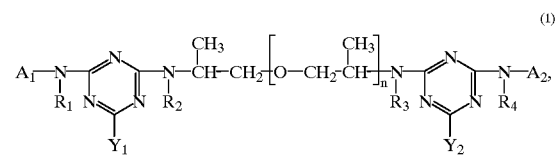

(1)

in which $A_1$ and $A_2$ independently of one another are the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $R_1$, $R_2$, $R_3$ and $R_4$ independently of one another are hydrogen or substituted or unsubstituted $C_1$–$C_4$alkyl, $Y_1$ and $Y_2$ independently of one another are halogen, carboxypyridinium, substituted or unsubstituted amino or a heterocyclic radical bonded via a nitrogen atom and n is a number from 1 to 7, are particularly suitable for dyeing or printing fiber materials containing hydroxyl groups or nitrogen. Dyeings with good fastness properties are obtained with a high dyeing yield.

8 Claims, No Drawings

DYES, PROCESSES FOR THEIR PREPARATION AND THEIR USE

This application is a continuation of application Ser. No. 08/662,097, filed Jun. 12, 1996 now abandoned.

The present invention relates to novel dyes, processes for their preparation and their use for dyeing or printing fibre materials.

The practice of dyeing with dyes has recently led to increased requirements regarding the quality of the dyeings and the profitability of the dyeing process. Consequently, there continues to be a need for novel dyes which have improved properties, in particular in respect of application.

Dyes which have an adequate solubility and substantivity and which, in the case of reactive dyes, at the same time show a good ease of wash off of the non-fixed portions are required for dyeing nowadays. They should furthermore have a good dyeing yield and high reactivity, and in particular dyeings should be produced with high degrees of fixing. These requirements are not met in all the properties by the known dyes.

The present invention is therefore based on the object of discovering novel, improved dyes, which have the qualities characterized above to a large extent, for dyeing and printing fibre materials. In the case of reactive dyes, the dyes should show, in particular, high fixing yields and high fibre-dye bond stabilities, and in addition the portions not fixed to the fibre should be easy to wash out. The dyes should furthermore produce dyeings with good all-round properties, for example light and wet fastness properties.

It has been found that the object described is largely achieved by the dyes defined below.

The invention therefore relates to dyes of the formula

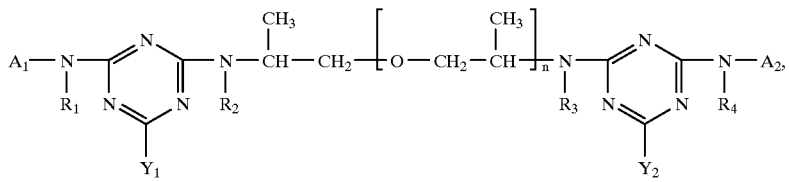

(1)

in which $A_1$ and $A_2$ independently of one another are the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, $R_1$, $R_2$, $R_3$ and $R_4$ independently of one another are hydrogen or substituted or unsubstituted $C_1$–$C_4$alkyl, $Y_1$ and $Y_2$ independently of one another are halogen, carboxypyridinium, substituted or unsubstituted amino or a heterocyclic radical bonded via a nitrogen atom and n is a number from 1 to 7.

The alkyl radicals $R_1$, $R_2$, $R_3$ and $R_4$ in the dyes of the formula (1) are straight-chain or branched; the alkyl radicals can be further substituted, for example by halogen, hydroxyl, cyano, $C_1$–$C_4$alkoxy, $C_1$–$C_4$alkoxycarbonyl, carboxyl, sulfamoyl, sulfo or sulfato. Examples of $R_1$, $R_2$, $R_3$ and $R_4$ are the following radicals: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. Preferably, $R_1$, $R_2$, $R_3$ and $R_4$ independently of one another are hydrogen, methyl or ethyl, in particular hydrogen.

n is preferably a number from 2 to 6, in particular the number 2, 3, 4 or 5, and preferably the number 2 or 3. Those dyes in which n is the number 1 are furthermore of interest.

Substituted or unsubstituted amino $Y_1$ and $Y_2$ can be, for example, amino, N-mono- or N,N-di-$C_1$–$C_4$alkylamino which is unsubstituted or substituted in the alkyl part, $C_5$–$C_7$cycloalkylamino which is unsubstituted or substituted in the cycloalkyl ring or phenylamino or N-$C_1$–$C_4$alkyl-N-phenylamino which is unsubstituted or substituted in the phenyl ring.

Examples of substituents of the alkyl part of the N-mono- or N,N-di-$C_1$–$C_4$alkylamino radicals mentioned are hydroxyl, sulfo, sulfato, carboxyl, $C_1$–$C_4$alkoxy, $C_1$–$C_4$hydroxyalkoxy or piperidin-1-yl. Preferred substituents here are hydroxyl, sulfo, $C_1$–$C_4$alkoxy, $C_1$–$C_4$hydroxyalkoxy or piperidin-1-yl, in particular hydroxyl, sulfo, $C_1$–$C_4$alkoxy and $C_1$–$C_4$hydroxyalkoxy, preferably hydroxyl and sulfo.

An example of substituents of the cycloalkyl ring of the $C_5$–$C_7$cycloalkylamino radicals mentioned is $C_1$–$C_4$alkyl, in particular methyl. Preferred $C_5$–$C_7$cycloalkylamino radicals are the corresponding cyclohexyl radicals.

Examples of substituents of the phenyl ring of the phenylamino and N-$C_1$–$C_4$alkyl-N-phenylamino radicals mentioned are $C_1$–$C_4$alkyl, $C_1$–$C_4$alkoxy, carboxyl, sulfo and halogen. These phenylamino and N-$C_1$–$C_4$alkyl-N-phenylamino radicals are preferably unsubstituted.

Heterocyclic radicals $Y_1$ and $Y_2$ bonded via a nitrogen atom are, for example, morpholino or piperidin-1-yl, preferably morpholino.

The radicals $Y_1$ and $Y_2$ in the formula (1) independently of one another are preferably fluorine, chlorine, carboxypyridinium, amino, N-mono- or N,N-di-$C_1$–$C_4$alkylamino which is unsubstituted or substituted in the alkyl part by hydroxyl, sulfo, sulfato, carboxyl, $C_1$–$C_4$alkoxy, $C_1$–$C_4$hydroxyalkoxy or piperidin-1-yl, $C_5$–$C_7$cycloalkylamino, which is unsubstituted or substituted in the cycloalkyl ring by $C_1$–$C_4$alkyl, phenylamino or N-$C_1$–$C_4$alkyl-N-phenylamino which is unsubstituted or substituted in the phenyl ring by $C_1$–$C_4$alkyl, $C_1$–$C_4$alkoxy, carboxyl, sulfo or halogen, morpholino or piperidin-1-yl.

Preferably, $Y_1$ and $Y_2$ independently of one another are fluorine, chlorine, amino, N-mono- or N,N-di-$C_1$–$C_4$alkylamino which is unsubstituted or substituted in the alkyl part by hydroxyl, sulfo, $C_1$–$C_4$alkoxy, $C_1$–$C_4$hydroxyalkoxy or piperidin-1-yl, phenylamino, N-$C_1$–$C_4$alkyl-N-phenylamino or morpholino.

Particularly preferably, $Y_1$ and $Y_2$ independently of one another are fluorine or, in particular, chlorine.

$Y_1$ and $Y_2$ preferably each have identical meanings.

The radicals $A_1$ and $A_2$ in the dyes of the formula (1) can contain the substituents customary in organic dyes bonded to their base structure.

The radicals $A_1$ and $A_2$ preferably have identical meanings.

Examples of substituents in the radicals $A_1$ and $A_2$ are: alkyl groups having 1 to 4 carbon atoms, such as methyl, ethyl, propyl, isopropyl or butyl, where the alkyl radicals can be further substituted, for example by hydroxyl, sulfo or sulfato; alkoxy groups having 1 to 4 carbon atoms, such as methoxy, ethoxy, propoxy, isopropoxy or butoxy, where the alkyl radicals can be further substituted, for example by hydroxyl, sulfo or sulfato; phenyl which is unsubstituted or substituted by $C_1$–$C_4$alkyl, $C_1$–$C_4$alkoxy, halogen, carboxyl or sulfo; acylamino groups having 1 to 8 carbon atoms, in particular such alkanoylamino groups, for example acetylamino or propionylamino; benzoylamino which is unsubstituted or substituted in the phenyl ring by $C_1$–$C_4$alkyl, $C_1$–$C_4$alkoxy, halogen or sulfo; phenylamino which is unsubstituted or substituted in the phenyl ring by $C_1$–$C_4$alkyl, $C_1$–$C_4$alkoxy, halogen or sulfo; N,N-di-β-hydroxyethylamino; N,N-di-β-sulfatoethylamino; sulfobenzylamino; N,N-disulfobenzylamino; alkoxycarbonyl having 1 to 4 carbon atoms in the alkoxy radical, such as methoxycarbonyl or ethoxycarbonyl; alkylsulfonyl having 1 to 4 carbon atoms, such as methylsulfonyl or ethylsulfonyl; trifluoromethyl; nitro; amino; cyano; halogen, such as fluorine, chlorine or bromine; carbamoyl; N-alkylcarbamoyl having 1 to 4 carbon atoms in the alkyl radical, such as N-methylcarbamoyl or N-ethylcarbamoyl; sulfamoyl; N-mono- or N,N-dialkylsulfamoyl having in each case 1 to 4 carbon atoms, such as N-methylsulfamoyl, N-ethylsulfamoyl, N-propylsulfamoyl, N-isopropylsulfamoyl or N-butylsulfamoyl, where the alkyl radicals can be further substituted, for example by hydroxyl or sulfo; N-(β-hydroxyethyl)sulfamoyl; N,N-di-(β-hydroxyethyl)-sulfamoyl; N-phenylsulfamoyl which is unsubstituted or substituted by $C_1$–$C_4$alkyl, $C_1$–$C_4$alkoxy, halogen, carboxyl or sulfo; ureido; hydroxyl; carboxyl; sulfomethyl or sulfo, and fibre-reactive radicals.

The radicals $A_1$ and $A_2$ preferably each contain at least one sulfo group, in particular 1 to 4 sulfo groups, and preferably 1 to 3 sulfo groups.

A reactive group in the radical $A_1$ or $A_2$ in the dyes of the formula (1) is, for example, an alkanoyl or alkylsulfonyl radical substituted by an atom which can be split off or a group which can be split off, an alkenoyl or alkenesulfonyl radical which is unsubstituted or substituted by an atom which can be split off or a group which can be split off, or an alkenoyl or alkenesulfonyl radical containing a vinyl group. The alkanoyl, alkylsulfonyl and alkenesulfonyl radicals mentioned as a rule contain 2 to 8 carbon atoms, and the alkanoyl radicals as a rule contain 3 to 8 carbon atoms. Further reactive groups are radicals which contain carbo- or heterocyclic 4-, 5- or 6-membered rings and are substituted by an atom which can be split off or a group which can be split off. Heterocyclic radicals are, for example, those which contain at least one substituent which can be split off bonded to a heterocyclic radical; inter alia, those which contain at least one reactive substituent bonded to a 5- or 6-membered heterocyclic ring, such as to a monoazine, diazine, triazine, pyridine, pyrimidine, pyridazine, pyrazine, thiazine, oxazine or asymmetric or symmetric triazine ring, or to such a ring system which has one or more fused-on aromatic rings, such as quinoline, phthalazine, cinnoline, quinazoline, quinoxaline, acridine, phenazine and phenanthridine ring system.

Atoms which can be split off and groups which can be split off are, in addition to others, for example halogen, such as fluorine, chlorine or bromine, ammonium, including hydrazinium, sulfato, thiosulfato, phosphato, acetoxy, propionoxy, azido, carboxypyridinium or thiocyanato.

Bridge members between the dye radical and the fibre-reactive radical are, in addition to the direct bond, the most diverse radicals. The bridge member is, for example, an aliphatic, aromatic or heterocyclic radical; the bridge member can also furthermore be composed of different such radicals. The bridge member as a rule contains at least one functional group, for example the carbonyl group or the amino group, where the amino group can be further substituted by $C_1$–$C_4$alkyl which is unsubstituted or substituted by halogen, hydroxyl, cyano, $C_1$–$C_4$alkoxy, $C_1$–$C_4$alkoxycarbonyl, carboxyl, sulfamoyl, sulfo or sulfato. Aliphatic radicals are, for example, an alkylene radical having 1 to 7 carbon atoms or branched isomers thereof. The carbon chain of the alkylene radical can be interrupted by a hetero atom, for example an oxygen atom. An aromatic radical is, for example, a phenyl radical, which can be substituted by $C_1$–$C_4$alkyl, for example methyl or ethyl, $C_1$–$C_4$alkoxy, for example methoxy or ethoxy, halogen, for example fluorine, bromine or, in particular, chlorine, carboxyl or sulfo, and a heterocyclic radical is, for example, a piperazine radical.

Examples of reactive groups are the following: vinylsulfonyl, β-chloroethylsulfonyl, β-sulfatoethylsulfonyl, β-acetoxyethylsulfonyl, phosphatoethylsulfonyl, β-thiosulfatoethylsulfonyl, N-methyl-N-(β-sulfoethylsulfonyl)amino, acryloyl, mono-, di- or trichloroacryloyl such as —CO—CCl=CH$_2$, —CO—CH=CH—Cl, —CO—CCl=CH—CH$_3$; mono-, di- or tribromoacryloyl such as —CO—CBr=CH$_2$, —CO—CH=CH—Br, —CO—CBr=CH—CH$_3$; and —CO—CCl=CH—COOH, —CO—CH=CCl—COOH, —CO—CBr=CH—COOH, —CO—CH=CBr—COOH, —CO—CCl=CCl—COOH, —CO—CBr=CBr—COOH; precursors of the acryloyl radical and the derivatives of the acryloyl radical, such as β-chloro- or β-bromopropionyl, 3-phenylsulfonylpropionyl, 3-methylsulfonylpropionyl, 2-chloro-3-phenylsulfonylpropionyl, 2,3-dichloropropionyl, 2,3-dibromopropionyl; and 2-fluoro-2-chloro-3,3-difluorocyclobutane-1-carbonyl, 2,2,3,3-tetrafluorocyclobutane-1-carbonyl or -1-sulfonyl, β-(2,2,3,3-tetrafluoro-1-cyclobutyl)-acryloyl, α- or β-alkenyl- or -arylsulfonylacryloyl groups, such as α- or β-methylsulfonylacryloyl, chloroacetyl, bromoacetyl, 4-(β-chloroethylsulfonyl)-butyryl, 4-vinylsulfonylbutyryl, 5-(β-chloroethylsulfonyl)-caproyl, 6-vinylsulfonylcaproyl; and 4-fluoro-3-nitro-benzoyl, 4-fluoro-3-nitrophenylsulfonyl, 4-fluoro-3-methylsulfonylbenzoyl, 4-fluoro-3-cyanobenzoyl, 2-fluoro-5-methylsulfonylbenzoyl.

Further examples are the following fibre-reactive radicals: mono- or dihalogeno-symmetric triazinyl radicals, for example 2,4-dichlorotriazin-6-yl, 2-amino-4-chlorotriazin-6-yl, 2-alkyl-amino-4-chlorotriazin-6-yl, such as 2-methylamino-4-chlorotriazin-6-yl, 2-ethylamino- or 3-propylamino-4-chlorotriazin-6-yl, 2-β-hydroxyethylamino-4-chlorotriazin-6-yl, 2-di-β-hydroxyethylamino-4-chlorotriazin-6-yl and the corresponding sulfuric acid half esters, 2-diethylamino-4-chlorotriazin-6-yl, 2-morpholino- or 2-piperidino-4-chlorotriazin-6-yl, 2-cyclohexylamino-4-chlorotriazin-6-yl, 2-arylamino- and substituted arylamino-4-chlorotriazin-6-yl, such as 2-phenylamino-4-chlorotriazin-6-yl, 2-(o-, m- or p-carboxyl- or sulfophenyl)-amino-4-chlorotriazin-6-yl, 2-alkoxy-4-chlorotriazin-6-yl, such as 2-methoxy- or ethoxy-4-chlorotriazin-6-yl, 2-(phenylsulfonylmethoxy)-4-chlorotriazin-6-yl, 2-aryloxy and substituted aryloxy-4- chlorotriazin-6-yl, such as 2-phenoxy-4-chlorotriazin-6-yl, 2-(p-sulfophenyl)-oxy-4-chlorotriazin-6-yl, 2-(o-, m- or p-methyl- or methoxyphenyl)-oxy-4-chlorotriazin-6-yl, 2-alkylmercapto- or 2-arylmercapto- or 2-(substituted aryl)-mercapto-4-chlorotriazin-6-yl, such as 2-β-hydroxyethyl-mercapto-4-chlorotriazin-6-yl, 2-phenylmercapto-4-chloro-triazin-6-yl, 3-(4'-methylphenyl)-mercapto-4-chlorotriazin-6-yl, 2-(2',4'-dinitro)-phenylmercapto-4-chlorotriazin-6-yl, 2-methyl-4-chlorotriazin-6-yl, 2-phenyl-4-chloro-triazin-6-yl, 2,4-difluoro-triazin-6-yl, monofluorotriazinyl radicals which are substituted by amino, alkylamino, aralkylamino or acylamino groups, where alkyl is, in particular, $C_1$–$C_4$alkyl which is unsubstituted or substituted, aralkyl is, in particular, phenyl-$C_1$–$C_4$alkyl which is unsubstituted or substituted and aryl is, in particular, phenyl or naphthyl which is unsubstituted or substituted by sulfo, $C_1$–$C_4$alkyl, $C_1$–$C_4$alkoxy, carboxylic acid groups, acylamino groups and halogen atoms, such as fluorine, chlorine or bromine, for example 2-amino-4-fluoro-triazin-6-yl, 2-methylamino-4-fluoro-triazin-6-yl, 2-ethyl-amino-4-fluoro-triazin-6-yl, 2-iso-propylamino-4-fluoro-triazin-6-yl, 2-dimethylamino-4-fluoro-triazin-6-yl, 2-diethylamino-4-fluoro-triazin-6-yl, 2-β-methoxy-ethylamino-4-fluorotriazin-6-yl, 2-β-hydroxyethylamino-4-fluoro-triazin-6-yl, 2-di-(β-hydroxyethylamino)-4-fluorotriazin-6-yl, 2-β-sulfoethylamino-4-fluoro-triazin-6-yl, 2-β-sulfoethyl-methylamino-4-fluoro-triazin-6-yl, 2-carboxymethylamino-4-fluoro-triazin- 6-yl, 2-β-cyanoethyl-amino-4-fluoro-triazin-6-yl, 2-benzolamino-4-fluoro-triazin-6-yl, 2-β-phenylethylamino-4-fluoro-triazin-6-yl, 2-benzyl-methylamino-4-fluoro-triazin-6-yl, 2-(2'-, 3'- or 4'-sulfobenzyl)-amino-4-fluoro-triazin-6-yl, 2-cyclohexylamino-4-fluoro-triazin-6-yl, 2-(o-, m-, p-methylphenyl)-amino-4-fluoro-triazin-6-yl, 2-(o-, m-, p-sulfophenyl)-amino-4-fluoro-triazin-6-yl, 2-(2',5'-disulfophenyl)-amino-4-fluoro-triazin-6-yl, 2-(o-, m-, p-chlorophenyl)-amino-4-fluoro-triazin-6-yl, 2-(o-, m-, p-methoxyphenyl)-4-fluoro-triazin-6-yl, 2-(2'-methyl-4'-sulfophenyl)-amino-4-fluoro-triazin-6-yl, 2-(2'-methyl-5'-sulfophenyl)-amino-4-fluoro-triazin-6-yl, 2-(2'-chloro-4'-sulfophenyl)-amino-4-fluoro-triazin-6-yl, 2-(2'-chloro-5'-sulfophenyl)-amino-4-fluoro-triazin-6-yl, 2-(2'-methoxy-4'-sulfophenyl)-amino-4-fluoro-triazin-6-yl, 2-(o-, m-, p-carboxyphenyl)-amino-4-fluoro-triazin-6-yl, 2-(2',4'-disulfophenyl)-amino-4-fluoro-triazin-6-yl, 2-(3',5'-disulfophenyl)-amino-4-fluoro-triazin-6-yl, 2-(2'-carboxy-4-sulfophenyl)-amino-4-fluoro-triazin-6-yl, 2-(2'-carboxy-4-sulfophenyl)-amino-4-fluoro-triazin-6-yl, 2-(6'-sulfonaphth-2'-yl-amino-4-fluoro-triazin-6-yl, 2-(4',8'-disulfonaphth-2'-yl)-amino-4-fluoro-triazin-6-yl, 2-(6',8'-disulfonaphth-2'-yl)-amino-4-fluoro-triazin-6-yl, 2-(N-methylphenyl)-amino-4-fluoro-triazin-6-yl, 2-(N-ethylphenyl)-amino-4-fluoro-triazin-6-yl, 2-(N-β-hydroxyethylphenyl)-amino-4-fluoro-triazin-6-yl, 2-(N-iso-propylphenyl)-amino-4-fluoro-triazin-6-yl, 2-morpholino-4-fluoro-triazin-6-yl, 2-piperidino-4-fluoro-triazin-6-yl, 2-(4', 6',8'-trisulfonaphth-2'-yl)-4-fluoro-triazin-6-yl, 2-(3',6',8'-trisulfonaphth-2'-yl)-4-fluoro-triazin-6-yl, 2-(3',6'-disulfonaphth-1'-yl)-4-fluoro-triazin-6-yl, mono-, di- or trihalopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulfo- or -5-mono-, -di- or -trichloromethyl- or -5-carboalkoxy-pyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methyl-thio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulfonyl, 2-chloroquinoxaline-3-carbonyl, 2- or 3-mono-chloroquinoxaline-6-carbonyl, 2- or 3-monochloroquinoxaline-6-sulfonyl, 2,3-dichloroquinoxaline-6-carbonyl, 2,3-dichloroquinoxaline-6-sulfonyl, 1,4-dichlorophthalazine-6-sulfonyl or -6-carbonyl, 2,4-dichloroquinazoline-7- or -6-sulfonyl- or -carbonyl, 2- or 3- or 4-(4',5'-dichloropyridaz-6'-in-1'-yl)-phenylsulfonyl- or -carbonyl-, β-(4',5'-dichloropyridaz-6'-on-1'-yl)-ethyl-carbonyl, N-methyl-N-(2,4-dichlorotriazin-6-yl)-carbamyl, N-methyl-N-(2-methylamino-4-chlorotriazan- 6-yl)-carbamyl, N-methyl-N-(2-dimethylamino-4-chlorotriazin-6-yl)-carbamyl, N-methyl- or N-ethyl-N-(2,4-dichlorotriazin-6-yl)-amino-acetyl, N-methyl-N-(2,3-dichloroquinoxaline-6-sulfonyl)-aminoacetyl, N-methyl-N-(2,3-dichloroquinoxaline-6-carbonyl)-aminoacetyl, and the corresponding bromine and fluorine derivatives of the abovementioned chlorine-substituted heterocyclic radicals, among these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl, 6-fluoro-5-chloro-pyrimidin-4-yl, 6-fluor-5-trifluoromethyl-pyrimidin-4-yl, 6-fluoro-2-methylpyrimidin-4-yl, 6-fluoro-5-chloro-2-methyl-pyrimidin-4-yl, 5,6-difluoro-pyrimidin-4-yl, 6-fluoro-5-chloro-2-trifluoromethylpyrimidin-4-yl, 6-fluoro-2-phenylpyrimidin-4-yl, 6-fluoro-5-cyano-pyrimidin-4-yl, 6-fluoro-5-nitropyrimidin-4-yl, 6-fluoro-5-methyl-sulfonyl-pyrimidin-4-yl, 6-fluoro-5-phenylsulfonyl-pyrimidin-4-yl, triazine radicals containing sulfonyl groups, such as 2,4-bis-(phenylsulfonyl)-triazin-6-yl, 2-(3'-carboxyphenyl)-sulfonyl-4-chlorotriazin-6-yl, 2-(3'-sulfophenyl)-sulfonyl-4-chlorotriazin-6-yl, 2,4-bis-(3'-carboxyphenylsulfonyl)-triazin-6-yl; pyrimidine rings containing sulfonyl groups, such as 2-carboxymethylsulfonyl-pyrimidin-4-yl, 2-methylsulfonyl-6-methylpyrimidin-4-yl, 2-methylsulfonyl-6-ethyl-pyrimidin-4-yl, 2-phenylsulfonyl-5-chloro-6-methyl-pyrimidinyl, 2,6-bis-methylsulfonyl-pyrimidin-4-yl, 2,6-bis-methyl-sulfonyl-5-chloro-pyrimidin-4-yl, 2,4-bis-methylsulfonyl-pyrimidine-5-sulfonyl, 2-methylsulfonylpyrimidin-4-yl, 2-phenylsulfonyl-pyrimidin-4-yl, 2-trichloromethylsulfonyl-6-methyl-pyrimidin-4-yl, 2-methylsulfonyl-5-chloro-6-methyl-pyrimidin-4-yl, 2-methylsulfonyl-5-bromo-6-methyl-pyrimidin-4-yl, 2-methyl-sulfonyl-5-chloro-6-ethyl-pyrimidin-4-yl, 2-methyl-sulfonyl-5-chloro-6-chloromethyl-pyrimidin-4-yl, 2-methyl-sulfonyl-4-chloro-6-methylpyrimidin-5-sulfonyl, 2-methylsulfonyl-5-nitro-6-methyl-pyrimidin-4-yl, 2,5,6-tris-methylsulfonyl-pyrimidin-4-yl, 2-methylsulfonyl-5,6-dimethylpyridin-4-yl, 2-ethylsulfonyl-5-chloro-6-methyl-pyrimidin-4-yl, 2-methylsulfonyl-6-chloro-pyrimidin-4-yl, 2,6-bis-methylsulfonyl-5-chloro-pyrimidin-4-yl, 2-methylsulfonyl-6-carbonyl-pyrimidin-4-yl, 2-methylsulfonyl-5-sulfopyrimidin-4-yl, 2-methylsulfonyl-6-carbomethoxy-pyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-sulfoethylsulfonyl-6-methyl-pyrimidin-4-yl, 2-methyl-sulfonyl-5-bromo-pyrimidin-4-yl, 2-phenyl-sulfonyl-5-chloro-pyrimidin-4-yl, 2-carboxymethylsulfonyl-5-chloro-6-methyl-pyrimidin-4-yl, 2-methylsulfonyl-6-chloropyrimidine-4- and -5-carbonyl, 2,6-bis(methylsulfonyl)-pyrimidine-4- or -5-carbonyl, 2-ethylsulfonyl-6-chloro-pyrimidine-5-carbonyl, 2,4-bis-(methylsulfonyl)-pyrimidine-5-sulfonyl, 2-methylsulfonyl-4-chloro-6-methyl-pyrimidine-5-sulfonyl or -carbonyl, triazine rings containing ammonium groups, such as trimethylammonium-4-phenylamino- or -4-(o-, m- or p-sulfophenyl)-aminotriazin-6-yl, 2-(1,1-dimethylhydrazinium)-4-phenylamino- or -4-(o-, m- or p-sulfophenyl)-aminotriazin-6-yl, 2-(2-isopropylidene-1,1-dimethyl)hydrazinium-4-phenylamino- or -4-(o-, m- or p-sulfophenyl)-amino-triazin-6-yl, 2-N-aminopyrrolidinium- or 2-amino-piperidinium-4-phenylamino- or -4-(o-, m- or p-sulfophenyl)-aminotriazin-6-yl, 2-N-aminopyrrolidinium- or 2-N-aminopiperidinium-4-phenylamino- or -4-(o-, m- or p-sulfophenyl)-aminotriazin-6-yl, and furthermore 4-phenylamino- or 4-(sulfophenylamino)-triazin-6-yl radicals which contain 1,4-bis-azabicyclo-[2,2,2]-octane or 1,2-bis-aza-bicyclo-[0,3,3]-octane bonded quarternally in the 2-position via a nitrogen bond, 2-pyridinium-4-phenylamino- or 4-(o-, m- or p-sulfophenyl)-aminotriazin-6-yl and the corresponding 2-oniumtriazin-6-yl radicals which are substituted in the 4-position by alkylamino, such as methylamino, ethylamino or β-hydroxyethylamino, or alkoxy, such as methoxy or ethoxy, or aroxy, such as phenoxy or sulfophenoxy groups: 2-chlorobenzothiazole-5- or -6-carbonyl or -5- or -6-sulfonyl, 2-arylsulfonyl- or -alkylsulfonylbenzothiazole-5- or -6-carbonyl or -5- or -6-sulfonyl, such as 2-methyl-sulfonyl- or 2-ethoxysulfonylbenzothiazole-5- or 6-sulfonyl or -carbonyl, 2-phenylsulfonyl-benzothiazole-5- or -6-sulfonyl or -carbonyl and the corresponding 2-sulfonylbenzothiazole-5- or 6-carbonyl or -sulfonyl derivatives containing sulfo groups in the fused-on benzene ring, 2-chlorobenzoxazole-5- or -6-carbonyl or -sulfonyl, 2-chloro-benzimidazole-5- or -6-carbonyl or -sulfonyl, 2-chloro-1-methylbenzimidazole-5- or -6-carbonyl or -sulfonyl, 2-chloro-4-methyl-1,3-thiazole-5-carbonyl or -4- or -5-sulfonyl, the N-oxide of the 4-chloro- or 4-nitroquinoline-5-carbonyl, or else the radicals 5-chloro-2,6-difluoro-1,3-dicyanophenyl, 2,4-difluoro-1,3,5-tricyanophenyl, 2,4,5-trifluoro-1,3-dicyano-phenyl, 2,4-dichloro-5-methylsulfonyl-pyrimidin-6-yl, 2,4-trichloro-5-ethylsulfonyl-pyrimidin-6-yl, 2-fluoro-5-methylsulfonyl-6'-(2'-sulfophenylamino)-pyrimidin-4-yl, 2,5-dichloro-6-methylsulfonyl-pyrimidin-4-yl.

A group of suitable reactive groups comprises those of the formulae

  (2a),

  (2b)

  (2c),

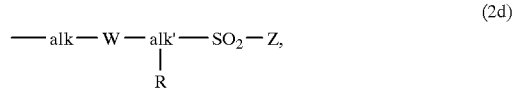  (2d)

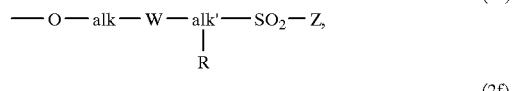  (2e)

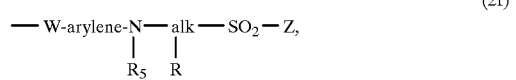  (2f)

—NH—CO—C(Hal)=CH$_2$  (2g),

—NH—CO—CH(Hal)—CH$_2$—Hal  (2h)

and

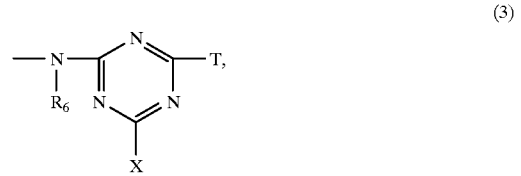  (3)

in which

W is a group of the formula —SO$_2$—NR$_5$—, —CONR$_5$— or —NR$_5$CO—,

R$_5$ is hydrogen, C$_1$–C$_4$alkyl which is unsubstituted or substituted by hydroxyl, sulfo, sulfato, carboxyl or cyano, or a radical of the formula

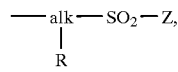

R is hydrogen, hydroxyl, sulfo, sulfato, carboxyl, cyano, halogen, C$_1$–C$_4$alkoxycarbonyl, C$_1$–C$_4$alkanoyloxy, carbamoyl or the group —SO$_2$—Z, Z is the radical —CH=CH$_2$ or —CH$_2$—CH$_2$—Y, Y is a leaving group, E is the radical —O— or —NR$_7$, R$_7$ is hydrogen or C$_1$–C$_4$alkyl, alk and alk' independently of one another are C$_1$–C$_6$alkylene, arylene is a phenylene or naphthylene radical which is unsubstituted or substituted by sulfo, carboxyl, C$_1$–C$_4$alkyl, C$_1$–C$_4$alkoxy or halogen, R$_6$ is hydrogen or C$_1$–C$_4$alkyl which is unsubstituted or substituted by carboxyl, cyano, hydroxyl, sulfo or sulfato, Hal is halogen and X is a group which can be split off as an anion, and
T is a radical of the formula

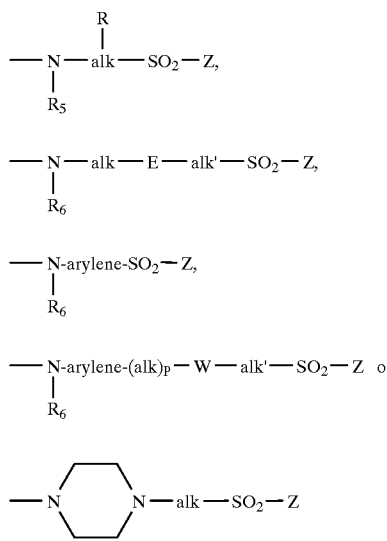

in which

R, $R_5$, $R_6$, E, W, Z, alk, alk' and arylene are as defined above and p is 0 or 1.

Suitable leaving groups Y are, for example, —Cl, —Br, —F, —OSO$_3$H, —SSO$_3$H, —OCO—CH$_3$, —OPO$_3$H$_2$, —OCO—CCl$_3$, —OCO—CHCl$_2$, —OCO—CH$_2$Cl, —OSO$_2$—C$_1$–C$_4$alkyl, —OSO$_2$—N(C$_1$–C$_4$alkyl)$_2$ or —OCO—C$_6$H$_5$.

Preferably, Y is a group of the formula —Cl, —OSO$_3$H, —SSO$_3$H, —OCO—CH$_3$, —OCO—C$_6$H$_5$ or —OPO$_3$H$_2$, in particular —OSO$_3$H.

alk and alk' independently of one another are, for example, a methylene, ethylene, 1,3-propylene, 1,4-butylene, 1,5-pentylene or 1,6-hexylene radical or branched isomers thereof.

alk and alk' are preferably a $C_1$–$C_4$alkylene radical, and particularly preferably an ethylene radical.

R is preferably hydrogen or the group —SO$_2$—Z, in which Z is as defined above. R is particularly preferably hydrogen.

$R_5$ is preferably hydrogen, $C_1$–$C_4$alkyl or a group —alk—SO$_2$—Z, in which alk and Z are each as defined above. $R_5$ is particularly preferably hydrogen or $C_1$–$C_4$alkyl, in particular hydrogen.

$R_6$ is preferably hydrogen or a $C_1$–$C_4$alkyl radical, and particularly preferably hydrogen.

Arylene is preferably a 1,3- or 1,4-phenylene radical, which is unsubstituted or substituted, for example by sulfo, methyl, methoxy or carboxyl.

E is preferably —NH—, and particularly preferably —O—.

W is preferably a group of the formula —CONH— or, in particular, —NHCO—.

X is, for example, fluorine, chlorine, bromine, sulfo, $C_1$–$C_4$alkylsulfonyl or phenylsulfonyl, and preferably fluorine or chlorine.

Hal is, for example, chlorine or, in particular, bromine.

Other interesting reactive groups are those of the formula (3) in which T is a group which can be split off as an anion or a non-reactive substituent.

A group T which can be split off as an anion is here, for example, fluorine, chlorine, bromine, sulfo, $C_1$–$C_4$alkylsulfonyl or phenylsulfonyl, and preferably fluorine, or in particular chlorine.

A non-reactive substituent T can be, for example, a hydroxyl, $C_1$–$C_4$alkoxy, $C_1$–$C_4$alkylthio, amino, N-$C_1$–$C_4$alkylamino or N,N-di-$C_1$–$C_4$alkylamino radical, where the alkyl is unsubstituted or substituted, for example by sulfo, sulfato, hydroxyl, carboxyl or phenyl, or a cyclohexylamino, morpholino or N-$C_1$–$C_4$alkyl-N-phenylamino or phenylamino or naphthylamino radical, where the phenyl or naphthyl is unsubstituted or substituted, for example by $C_1$–$C_4$alkyl, $C_1$–$C_4$alkoxy, carboxyl, sulfo or halogen.

Examples of suitable non-reactive substituents T are amino, methylamino, ethylamino, β-hydroxyethylamino, N,N-di-β-hydroxyethylamino, β-sulfoethylamino, cyclohexylamino, morpholino, o-, m- or p-chlorophenylamino, o-, m- or p-methylphenylamino, o-, m- or p-methoxyphenylamino, o-, m- or p-sulfophenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or isopropoxy and hydroxyl.

A non-reactive substituent T is preferably amino, N-$C_1$–$C_4$alkylamino, which is unsubstituted in the alkyl part or substituted by hydroxyl, sulfato or sulfo, morpholino, phenylamino or N-$C_1$–$C_4$alkyl-N-phenylamino, in which the phenyl is in each case unsubstituted or substituted by sulfo, carboxyl, methyl or methoxy. Phenylamino or N-$C_1$–$C_4$alkyl-N-phenylamino in which the phenyl is in each case unsubstituted or substituted by sulfo, carboxyl, methyl or methoxy are particularly preferred.

Other interesting reactive groups are pyrimidine or quinoxaline radicals, each of which has at least one group which can be split off as an anion. Examples are the 2,3-dichloroquinoxaline-6-carbonylamino radical, the 2,4-dichloropyrimidine-5-carbonylamino radical and the radical of the formula

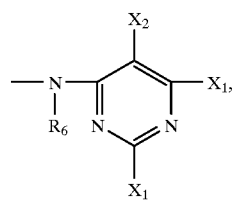

(5)

in which one of the radicals XI is a group which can be split off as an anion and the other radical XI is as defined and preferred for non-reactive substituents T, or is a radical of the formulae (4a) to (4e) or a group which can be split off as an anion, $X_2$ is a negative substituent and $R_6$ independently is as defined under formula (3).

The radical $X_1$ which can be split off as an anion is preferably fluorine or chlorine. Examples of suitable radicals $X_2$ are nitro, cyano, $C_1$–$C_4$alkylsulfonyl, carboxyl, chlorine, hydroxyl, $C_1$–$C_4$alkoxysulfonyl, $C_1$–$C_4$alkylsulfinyl, $C_1$–$C_4$alkoxycarbonyl or $C_2$–$C_4$alkanoyl, $X_2$ preferably being chlorine, cyano and methylsulfonyl.

Particularly preferred reactive groups are those of the formula (2a), (2b), (2g) and (2h). Z, W, alk, R and Hal here are as defined and preferred above. Z is preferably a vinyl or β-sulfatoethyl radical. The radical W is preferably a radical of the formula —NH—CO—, R is preferably hydrogen and alk is preferably ethylene. Hal is preferably chlorine or, in particular, bromine. Reactive groups of the formula (2a) are of particular interest.

Interesting reactive groups are furthermore those of the formula (3) in which T, X and $R_6$ are as defined and preferred above. Particularly preferably, T here is a non-reactive radical, in particular phenylamino or N-$C_1$–$C_4$alkyl-N-phenylamino, in which the phenyl is in each case unsubstituted or substituted by sulfur, carboxyl, methyl or methoxy. X here is particularly preferably fluorine or chlorine. $R_6$ is particularly preferably hydrogen, methyl or ethyl, in particular hydrogen.

Particularly preferably, the radicals $A_1$ and $A_2$ contain no reactive group.

Preferably, $A_1$ and $A_2$ independently of one another are the radical of a monoazo, disazo, anthraquinone, dioxazine, phthalocyanine or formazan dye.

Radicals of a monoazo or disazo dye are, in particular, the following:

Dye radicals of a mono- or disazo dye, of the formula

(6)

or

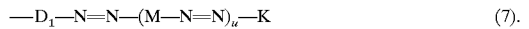

(7).

In these formulae, $D_1$ is the radical of a diazo component of the benzene or naphthalene series, M is the radical of a central component of the benzene or naphthalene series, K is the radical of a coupling component of the benzene, naphthalene, pyrazolone, 6-hydroxypyrid-2-one or acetoacetic acid arylamide series and u is the number 0 or 1, where $D_1$, M and K can carry the substituents customary for azo dyes, for example those defined above. Such substituents are, in particular, $C_1$–$C_4$alkyl or $C_1$–$C_4$alkoxy which is unsubstituted or further substituted by hydroxyl, sulfo or sulfato, halogen, carboxyl, sulfo, nitro, cyano, trifluoromethyl, sulfamoyl, carbamoyl, amino, ureido, hydroxyl, carboxyl, sulfomethyl, $C_2$–$C_4$alkanoylamino, benzoylamino which is unsubstituted or substituted in the phenyl ring by $C_1$–$C_4$alkyl, $C_1$–$C_4$alkoxy, halogen or sulfo, phenyl which is unsubstituted or substituted by $C_1$–$C_4$alkyl, $C_1$–$C_4$alkoxy, halogen, carboxyl or sulfo, and fibre-reactive radicals, where the fibre-reactive radicals are as defined and preferred above. The dyes are furthermore the metal complexes derived from the dye radicals of the formulae (6) and (7), the dye radicals being, in particular, those of a 1:1 copper complex azo dye of the benzene or naphthalene series, in which the copper atom is bonded to in each case a metallizable group on both sides in the ortho-position relative to the azo bridge.

Particularly preferred radicals of a mono or disazo dye are the following:

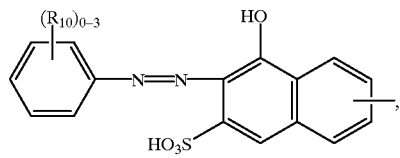

(8a)

in which $R_{10}$ is 0 to 3 identical or different substituents from the group consisting of $C_1$–$C_4$alkyl, $C_1$–$C_4$alkoxy, halogen, carboxyl and sulfo,

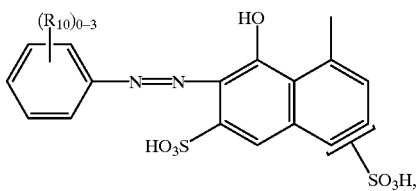

(8b)

in which $R_{10}$ is 0 to 3 identical or different substituents from the group consisting of $C_1$–$C_4$alkyl, $C_1$–$C_4$alkoxy, halogen, carboxyl and sulfo,

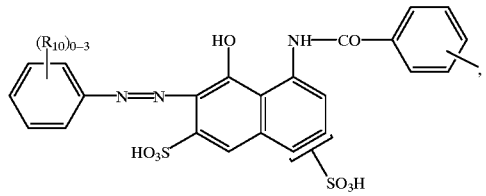

(8c)

in which $R_{10}$ is 0 to 3 identical or different substituents from the group consisting of $C_1$–$C_4$alkyl, $C_1$–$C_4$alkoxy, halogen, carboxyl and sulfo,

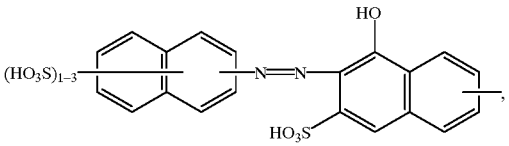

(8d)

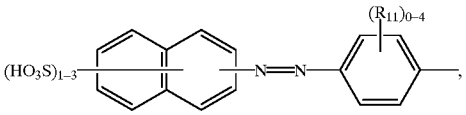

(8e)

in which $R_{11}$ is 0 to 4 identical or different substituents from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxyl, carboxyl, sulfomethyl and sulfo,

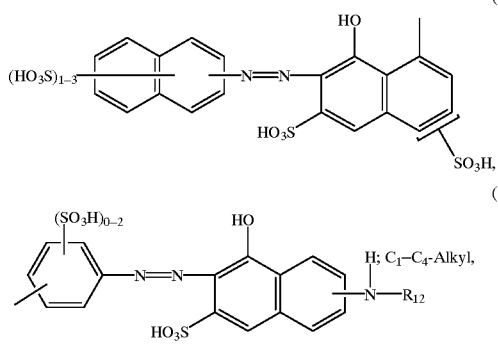
(8f)

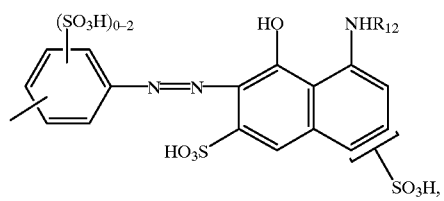
(8g)

in which

R$_{12}$ is C$_1$–C$_4$alkanoyl, benzoyl or a halogenotriazinyl radical which is unsubstituted or further substituted,

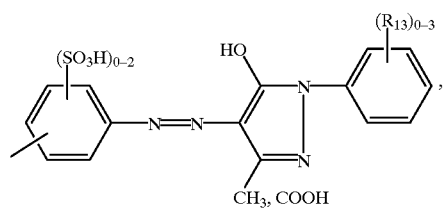
(8h)

in which

R$_{12}$ is C$_1$–C$_4$alkanoyl, benzoyl or a halogenotriazinyl radical which is unsubstituted or further substituted,

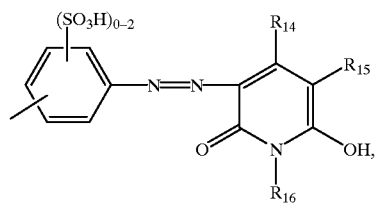
(8i)

in which

R$_{13}$ is 0 to 3 identical or different substituents from the group consisting of C$_1$–C$_4$alkyl, C$_1$–C$_4$alkoxy, halogen, carboxyl and sulfo, (8j)

in which

R$_{14}$ and R$_{16}$ independently of one another are hydrogen, C$_1$–C$_4$alkyl or phenyl, and R$_{15}$ is hydrogen, cyano, carbamoyl or sulfomethyl,

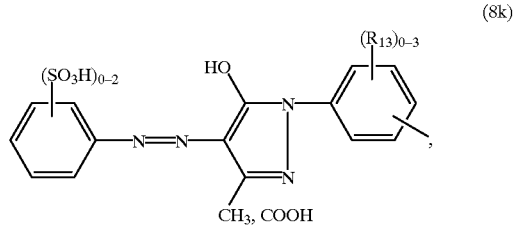
(8k)

in which R$_{13}$ is 0 to 3 identical or different substituents from the group consisting of C$_1$–C$_4$alkyl, C$_1$–C$_4$alkoxy, halogen, carboxyl and sulfo,

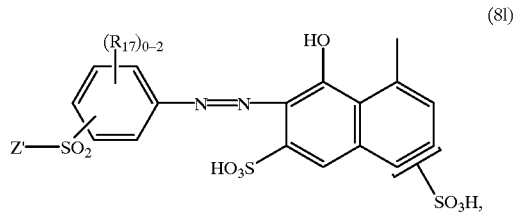
(8l)

in which

R$_{17}$ is 0 to 2 identical or different substituents from the group consisting of C$_1$–C$_4$alkyl, C$_1$–C$_4$alkoxy, halogen, carboxyl and sulfo; and Z' is β-sulfatoethyl, β-thiosulfatoethyl, β-phosphatoethyl, β-acyloxyethyl, β-haloethyl or vinyl,

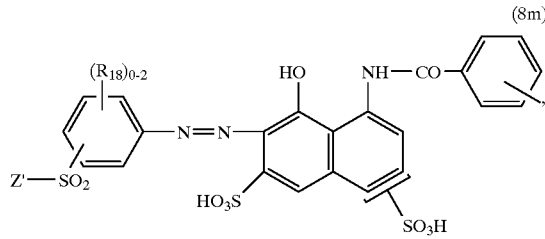
(8m)

in which

R$_{18}$ is 0 to 2 identical or different substituents from the group consisting of C$_1$–C$_4$alkyl, C$_1$–C$_4$alkoxy, halogen, carboxyl and sulfo; and Z' is β-sulfatoethyl, β-thiosulfatoethyl, β-phosphatoethyl, β-acyloxyethyl, β-haloethyl or vinyl,

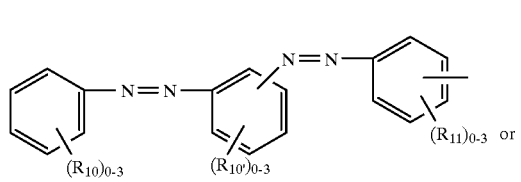
(8n)

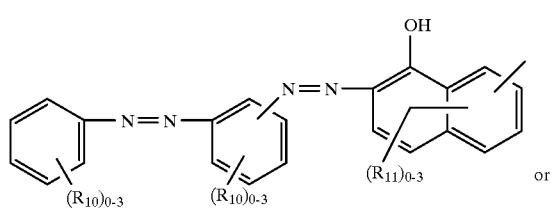
(8o)

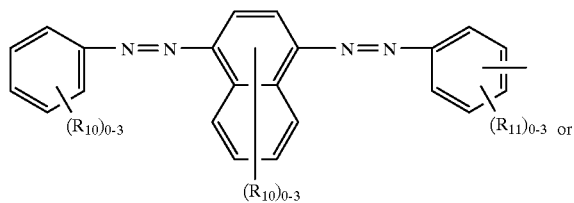
(8p)

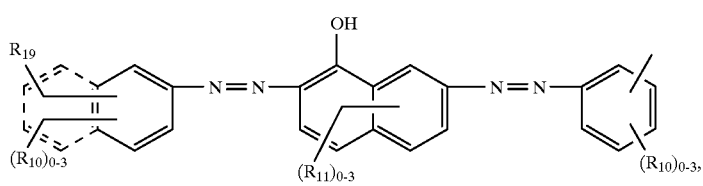
(8q)

in which $R_{10}$ is 0 to 3 identical or different substituents from the group consisting of $C_1$–$C_4$alkyl, $C_1$–$C_4$alkoxy, halogen, carboxyl and sulfo, $R_{10}'$ is as defined for $R_{10}$ and can additionally be $C_1$–$C_4$hydroxyalkoxy or $C_1$–$C_4$sulfatoalkoxy, $R_{11}$ is 0 to 3 identical or different substituents from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxyl, carboxyl, sulfomethyl and sulfo and $R_{19}$ is hydrogen or a radical of the formula —$SO_2Z'$, —NH—CO—$(CH_2)_{2-3}$—$SO_2Z'$, —NH—CO—C(Hal)=$CH_2$ or —NH—CO—CH(Hal)—$CH_2$—Hal, in which $Z'$ is β-sulfatoethyl, β-thiosulfatoethyl, β-phosphatoethyl, β-acyloxyethyl, β-haloethyl or vinyl and Hal is halogen.

The radicals of the formulae (8a) to (8q) can also contain as a further substituent in the phenyl or naphthyl ring a radical of the formula —$SO_2Z'$, in which $Z'$ is β-sulfatoethyl, β-thiosulfatoethyl, β-phosphatoethyl, β-acyloxyethyl, β-haloethyl or vinyl. $Z'$ is preferably β-sulfatoethyl or vinyl, in particular Vinyl.

The radical of a formazan dye is preferably a dye radical of the formula

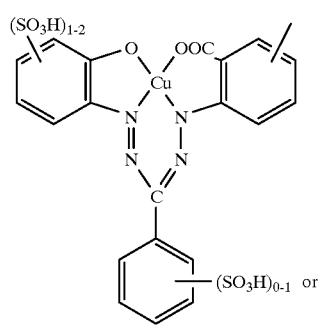
(8r)

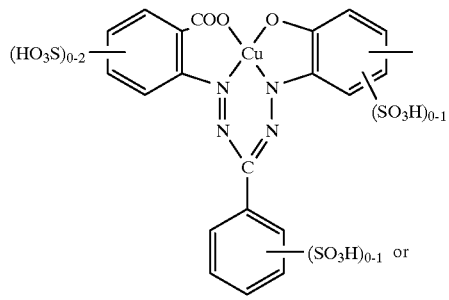
(8s)

(8t)

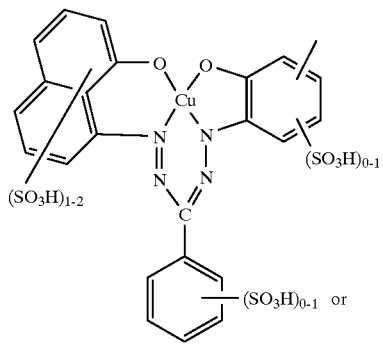

(8u)

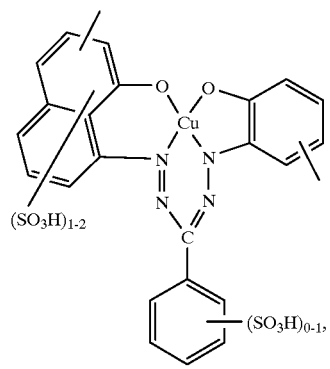

in which the benzene nuclei contain no further substituents or are further substituted by $C_1$–$C_4$alkyl, $C_1$–$C_4$alkoxy, $C_1$–$C_4$alkylsulfonyl, halogen or carboxyl.

The radical of a phthalocyanine dye is preferably a radical of the formula (9)

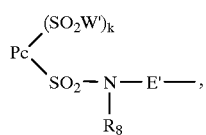

in which

Pc is the radical of a metal phthalocyanine, in particular the radical of a copper or nickel phthalocyanine;

W' is —OH and/or —$NR_9R_9'$;

$R_9$ and $R_9'$ independently of one another are hydrogen or $C_1$–$C_4$alkyl which is unsubstituted or substituted by hydroxyl or sulfo;

$R_8$ is hydrogen or $C_1$–$C_4$alkyl;

E' is a phenylene radical which is unsubstituted or substituted by $C_1$–$C_4$alkyl, halogen, carboxyl or sulfo, or a $C_2$–$C_6$alkylene radical; and k is 1 to 3.

$R_9$ and $R_9'$ are preferably hydrogen.

E' is preferably a phenylene radical which is unsubstituted or substituted by $C_1$–$C_4$alkyl, halogen, carboxyl or sulfo.

Pc is preferably the radical of a copper phthalocyanine.

The radical of a dioxazine dye is preferably a radical of the formula (10)

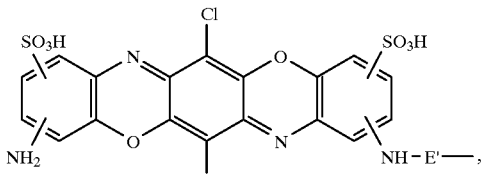

in which

E' is a phenylene radical which is unsubstituted or substituted by $C_1$–$C_4$alkyl, halogen, carboxyl or sulfo, or a $C_2$–$C_6$alkylene radical and the outer benzene rings in the formula (10) contain no further substituents or are further substituted by $C_1$–$C_4$alkyl, $C_1$–$C_4$alkoxy, acetylamino, nitro, halogen, carboxyl, sulfo or —$SO_2$—Z', in which Z' is β-sulfatoethyl, β-thiosulfatoethyl, β-phosphatoethyl, β-acyloxyethyl, β-haloethyl or vinyl.

The radical of an anthraquinone dye is preferably a radical of the formula (11)

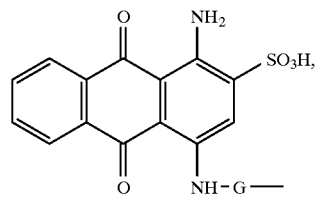

in which

G is a phenylene, cyclohexylene, phenylenemethylene or $C_2$–$C_6$alkylene radical, where the anthraquinone nucleus can be substituted by a further sulfo group and a phenyl radical G can be substituted by $C_1$–$C_4$alkyl, $C_1$–$C_4$alkoxy, halogen, carboxyl or sulfo, and the dye preferably contains at least 2 sulfo groups. Preferably, G is a phenyl radical which is unsubstituted or substituted by $C_1$–$C_4$alkyl, $C_1$–$C_4$alkoxy, halogen, carboxyl or sulfo.

$A_1$ and $A_2$ are especially preferably radicals of the formulae (8a) to (8u), (9), (10) or (11). The radicals $Y_1$, $Y_2$, $R_1$, $R_2$, $R_3$ and $R_4$ and the number n of the dyes of the formula (1) are as defined and preferred above.

Dyes of the formula (1) are, in particular, those in which $Y_1$ and $Y_2$ independently of one another are fluorine or, preferably, chlorine, $R_1$, $R_2$, $R_3$ and $R_4$ independently of one another are hydrogen, methyl or ethyl, in particular hydrogen, and $A_1$ and $A_2$ are the radicals of the formulae (8a) to (8u), (9), (10) or (11). Here, the number n is as defined and preferred above.

The present invention furthermore relates to dye mixtures which comprise at least two dyes of the above formula (1). The dyes of the formula (1) and the radicals $A_1$, $A_2$, $Y_1$, $Y_2$, $R_1$, $R_2$, $R_3$ and $R_4$ and the number n are as defined and preferred above.

The dye mixtures according to the invention preferably comprise at least two dyes of the formula (1) which differ from one another in respect of the bridge member which joins the two triazine rings. Preferably, the dyes differ in respect of the number n. The number n here is as defined and preferred above. Particularly preferably, the meanings of the other substituents of the two dyes of the formula (1) mentioned are identical here.

Dye mixtures which comprise at least two dyes of the formula (1), the ratio of these two dyes of the formula (1) being preferably 5:95 to 95:5, in particular 10:90 to 90:10, and preferably 40:60 to 60:40, are of very particular interest.

The present invention furthermore relates to a process for the preparation of dyes of the formula (1), which comprises reacting at least one compound of the formulae

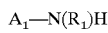

$$A_1\text{—}N(R_1)H \quad (12a)$$

and $$A_2\text{—}N(R_4)H \quad (12b)$$

or corresponding dye intermediates, at least one halotriazine compound and at least one diamine of the formula

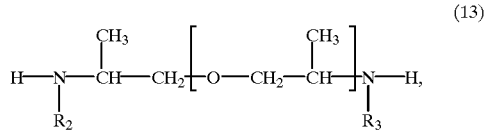

(13)

and if appropriate at least one compound of the formulae $$Y_1\text{—}H \quad (14a)$$

and $$Y_2\text{—}H \quad (14b)$$

in which $A_1$, $A_2$, $R_1$, $R_2$, $R_3$, $R_4$ and n are as defined above under formula (1) and $Y_1$ and $Y_2$ independently of one another are carboxypyridinium, substituted or unsubstituted amino or a heterocyclic radical bonded via a nitrogen atom, with one another in any sequence, if appropriate a further conversion reaction subsequently being carried out and, if dye intermediates are used, the resulting intermediates are converted into the desired dyes.

The preparation of the end dyes from intermediates is, above all, a coupling reaction which leads to azo dyes. The coupling reactions are carried out by processes known per se, for example in an aqueous medium at an acid, or neutral to weakly alkaline pH, in particular at a pH of 2 to 8, and at temperatures of, for example, 0 to 50° C.

Since the individual process steps described above can be carried out in different sequences, and if appropriate in some cases also simultaneously, various process variants are possible. In general, the reaction is carried out stepwise in succession, the sequence of the simple reactions between the individual reaction components advantageously depending on the particular conditions.

One process variant comprises subjecting one of the compounds of the formulae (12a) and (12b) to a condensation reaction with a halotriazine compound, subjecting the resulting product to a condensation reaction with a diamine of the formula (13) and reacting the resulting reaction product with the other compound of the formulae (12b) and (12a), which has first been subjected to a condensation reaction with a halotriazine compound. If appropriate, condensation with at least one of the compounds of the formulae (14a) and (14b) follows.

The present invention furthermore relates to a process for the preparation of the dye mixtures according to the invention. This can be carried out, on the one hand, by mixing the individual components, or as described above for the preparation of the dyes of the formula (1), at least two compounds of the formulae (12a) and (12b) which differ from one another, or at least two compounds of the formulae (14a) and (14b) which differ from one another, or at least two compounds of the formula (13) which differ from one another, or at least two halotriazine compounds which differ from one another being used. Preferably, different diamines of the formula (13) are used.

If the compounds of the formulae (12a) and (12b) have identical meanings, for example, these compounds are preferably subjected to a condensation reaction with a halotriazine compound and the resulting product is subjected to a condensation reaction with at least two diamines of the formula (13).

If only one diamine of the formula (13) is used, for example, a mixture of compounds of the formulae (12a) and (12b) which differ from one another is first subjected to a condensation reaction with a halotriazine compound and the resulting reaction mixture is then reacted with a diamine of the formula (13).

The halotriazine compounds used are preferably cyanuric halides, for example cyanuric chloride or cyanuric fluoride. A carboxypyridinium compound or a compound of the formula (14a) or (14b) is as a rule introduced after a condensation reaction of the corresponding cyanuric halides, and this is carried out by processes known for this purpose.

The compounds of the formulae (12a), (12b), (13), (14a) and (14b) and the halotriazine compounds are known or can be obtained analogously to known compounds.

The individual condensation reactions are carried out, for example, by processes known per se, as a rule in aqueous solution, at a temperature of, for example, 0 to 50° C. and at a pH of, for example, 4 to 10.

Mixtures of individual dyes can as a rule be separated by suitable separation methods, for example by chromatographic separation methods.

The dyes of the formula (1) which contain a sulfo or sulfato group are either in the form of their free acids or, preferably, in the form of salts thereof. Salts are, for example, the alkali metal, alkaline earth metal or ammonium salts or the salts of an organic amine. Examples are the sodium, lithium, potassium or ammonium salts or the salt of mono-, di- or triethanolamine.

The dye mixtures according to the invention and the dyes according to the invention are suitable for dyeing and printing the most diverse materials, such as fibre materials containing hydroxyl groups or nitrogen. Examples are silk, leather, wool, polyamide fibres and polyurethanes, and in particular all types of cellulosic fibre materials. Such cellulosic fibre materials are, for example, the naturally occurring cellulose fibres, such as cotton, linen and hemp, and cellulose and regenerated cellulose. The dye mixtures according to the invention and the dyes according to the invention are also suitable for dyeing or printing fibres which contain hydroxyl groups and are contained in blend fabrics, for example mixtures of cotton with polyester fibres or polyamide fibres. The dye mixtures according to the invention and the dyes according to the invention are particularly suitable for dyeing or printing cellulosic fibre materials. They can furthermore be used for dyeing or printing naturally occurring or synthetic polyamide fibre materials.

The dye mixtures according to the invention and the dyes according to the invention can be applied to the fibre material and if appropriate fixed to the fibre in various ways, in particular in the form of aqueous dye solutions and printing pastes. They are suitable both for the exhaust method and for dyeing by the pad-dyeing method, in which the goods are impregnated with aqueous dye solutions, which may contain salts, and the dyes are fixed, after treatment with alkali or in the presence of alkali, if appropriate under the action of heat. They are particularly suitable as reactive dyes for the so-called cold pad-batch process, in which the dye is applied on the padder together with the alkali and then fixed by storage at room temperature for several hours. After fixing, the dyeings or prints are rinsed thoroughly with cold and hot water, if appropriate with the addition of an agent which has a dispersing action and promotes diffusion of the non-fixed portions.

The dyes according to the invention and the dye mixtures according to the invention are distinguished by a high reactivity, good fixing capacity, a very good build-up capacity and good solubility. They can therefore be employed by the exhaust dyeing method at low dyeing temperatures, and require only short steaming times in the pad-steam process. The degrees of fixing of the reactive dyes are high and the non-fixed portions can easily be washed out, the difference between the degree of exhaustion and degree of fixing being remarkably small, i.e. the soaping loss being very low. The dyes according to the invention, and in particular the dye mixtures according to the invention, are also particularly suitable for printing, in particular on cotton, but also for printing nitrogen-containing fibres, for example wool or silk, or blend fabrics which comprise wool or silk.

The reactive dyeings and prints produced with the dyes according to the invention and with the dye mixtures according to the invention have a high colour strength and a high fibre-dye bond stability both in the acid and in the alkaline range. The dyeings and prints produced with the dyes according to the invention and with the dye mixtures according to the invention furthermore have a good fastness to light and very good wet fastness properties, such as fastnesses to washing, water, sea water, crossdyeing and perspiration, as well as a good fastness to pleating, fastness to ironing and fastness to rubbing.

The following examples serve to illustrate the invention. The temperatures are in degrees Celsius and parts and percentages are by weight, unless noted otherwise. Parts by weight bear the same relationship to parts by volume as the kilogram to the liter.

EXAMPLE 1

19 parts of cyanuric chloride are stirred vigorously into 50 parts of water, with the addition of a wetting agent and 5 parts of a disodium hydrogen phosphate, at a temperature of 0° C. A neutral solution of 27 parts of 4,6-diaminobenzene-1,3-disulfonic acid in 200 parts of water is added dropwise; during this operation, the pH is kept at a value of 4.5 by addition of sodium hydroxide solution. When the reaction has ended, 25 parts of 32% hydrochloric acid and 7 parts of sodium nitrite are added, the mixture is stirred for 30 minutes and the excess nitrite is destroyed with sulfamic acid. The suspension is added dropwise to a neutral solution of 20 parts of 1-ethyl-6-hydroxy-4-methyl-2-pyridonecarbonylamide in 50 parts of water, during which the pH is kept constant at a value of 7 by addition of an aqueous sodium hydroxide solution. A solution of 9.5 parts of a diamine of the formula

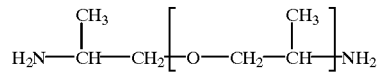

in 30 parts of water is then added dropwise such that the pH does not exceed a value of 9. Towards the end of the reaction, the mixture is then heated to a temperature of 40° C. When the condensation reaction has ended, the resulting product is precipitated by addition of sodium chloride, filtered off with suction and dried. A dye which, in the form of the free acid, is the compound of the formula

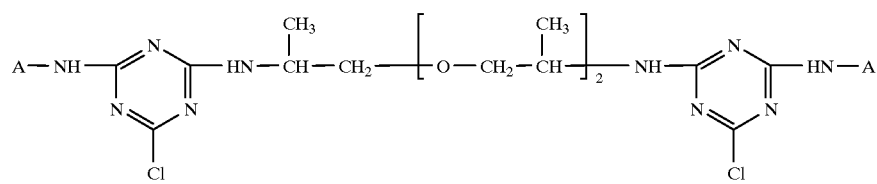

in which
A in each case is a radical of the formula

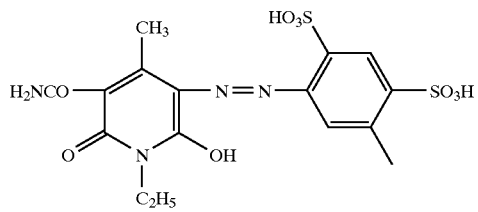

is obtained. The resulting dye dyes cotton in brilliant yellow colour shades.

EXAMPLE 2

14 parts of cyanuric fluoride are added dropwise to a neutral solution of 50 parts of 7-amino-4-hydroxy-3-(2,5-disulfophenylazo)-naphthalene-2-sulfonic acid and 5 parts of disodium hydrogen phosphate in 500 parts of water at a temperature below 2° C.; during this operation, the pH is kept constant by addition of aqueous sodium hydroxide solution. When the reaction has ended, a solution of 18.5 parts of a diamine of the formula

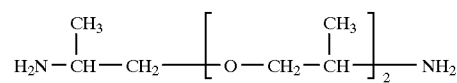

in 90 parts of water is added such that the pH does not exceed a value of 6, and the pH is kept at a value of 6. Solution 1 is obtained.

14 parts of cyanuric fluoride are added dropwise to a neutral solution of 45 parts of 7-amino-4-hydroxy-3-(4-methoxy-2-sulfo-phenylazo)-naphthalene-2-sulfonic acid and 5 parts of disodium hydrogen phosphate in 500 parts of water at a temperature below 2° C.; during this operation, the pH is kept constant by addition of aqueous sodium hydroxide solution. Solution 2 is obtained.

Solution 2 is added to solution 1 and the pH is increased to and kept at a value of 8.5. The solution is allowed to warm to room temperature and is freed from salt by dialysis, and the resulting product is evaporated. A mixture of the dyes, shown in the form of the free acids, of the formulae

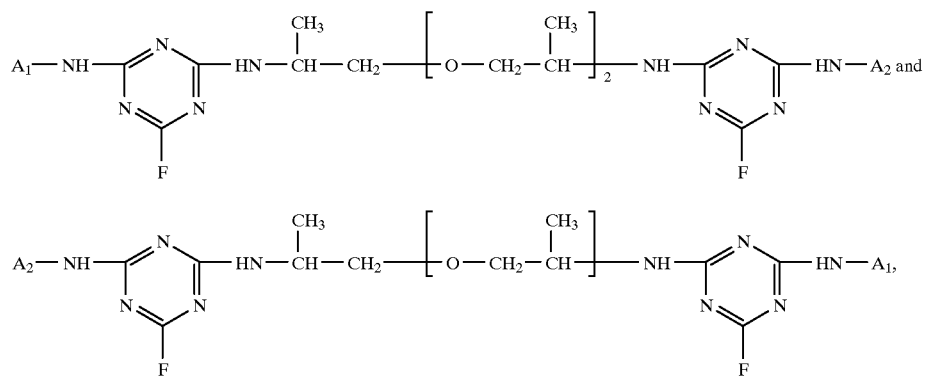

in which $A_1$ is a radical of the formula

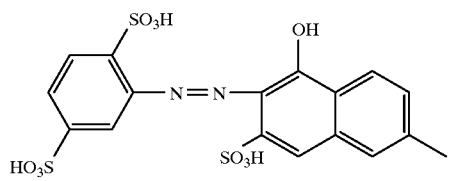

and
$A_2$ is a radical of the formula

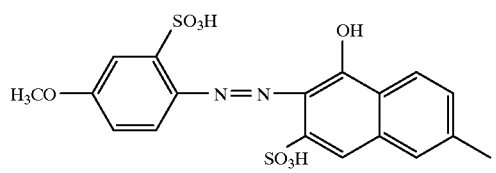

is obtained. The resulting dye mixture dyes cotton in brilliant orange colour shades.

EXAMPLES 3 TO 106

Dyes of the formula

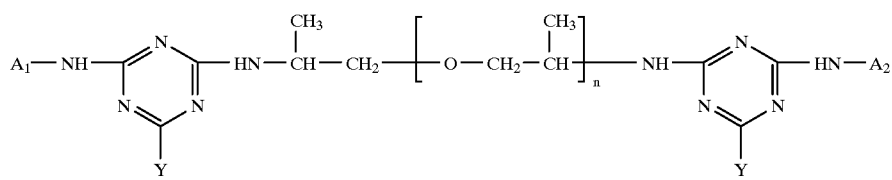

in which $A_1$, $A_2$, n and Y are as defined in columns 2 to 5 in the following Table 1, can be obtained in a manner analogous to the instructions in Example 1 or 2. The dyes dye cotton in the colour shades stated in column 6 in Table 1. The radicals $A_1$ and $A_2$ are designated by the letters A to Z6, which have the following meanings:

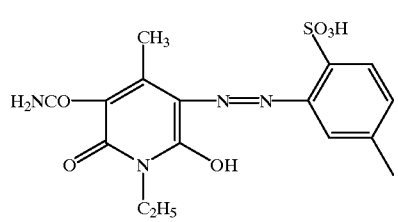

A

-continued
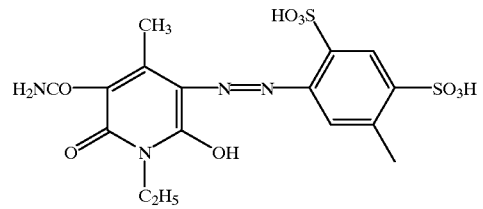
B
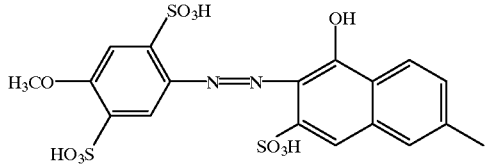
J
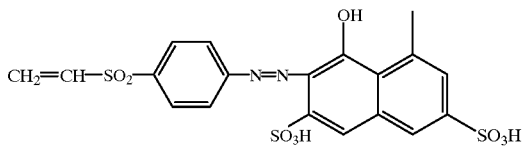
K
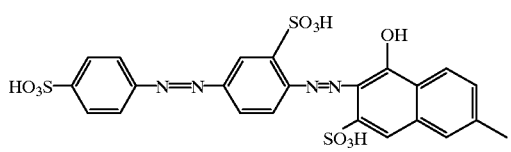
L
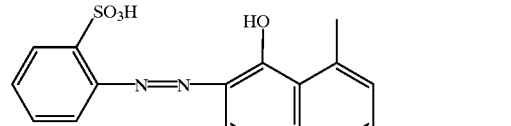
M
C
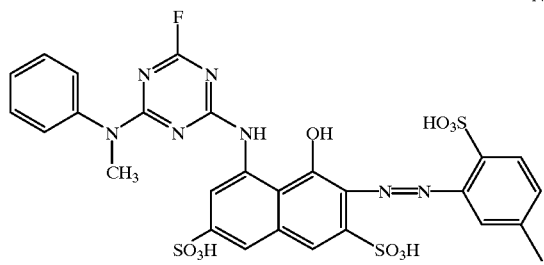
N
D
E
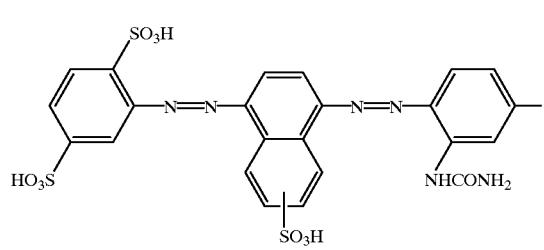
O
F
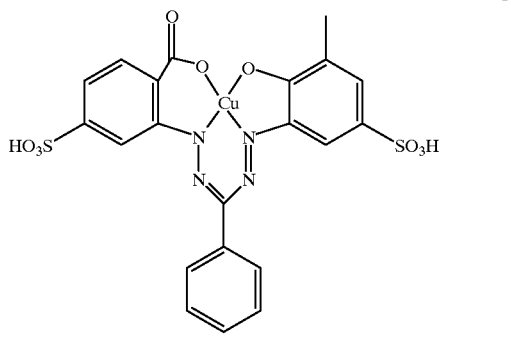
P
G
H
I Q
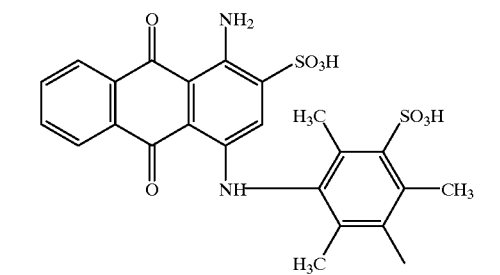
R
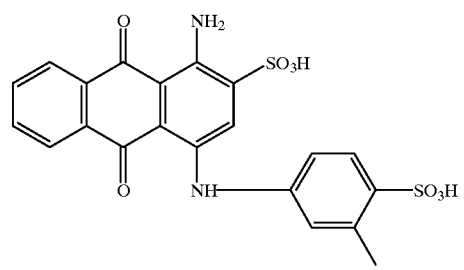
S
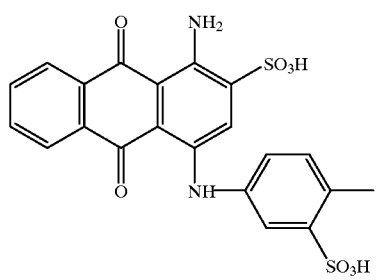
T
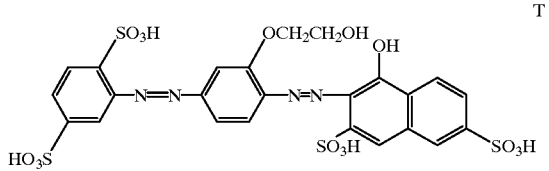
U
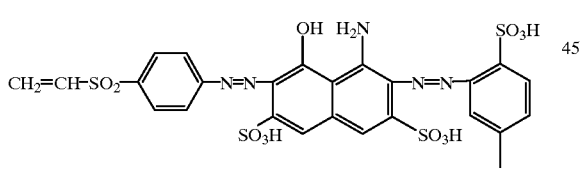
V
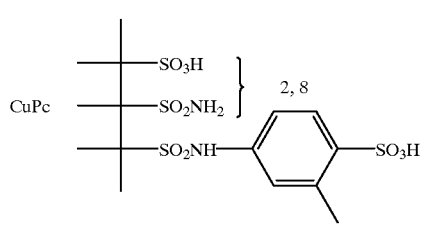
W
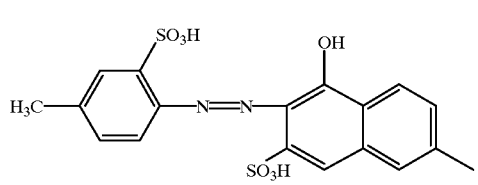
X
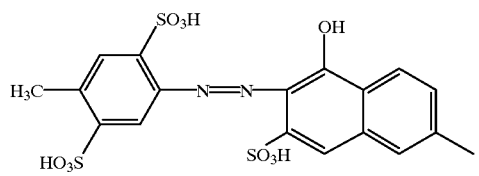
Y
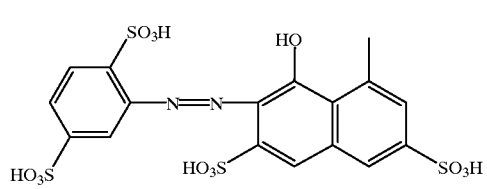
Z
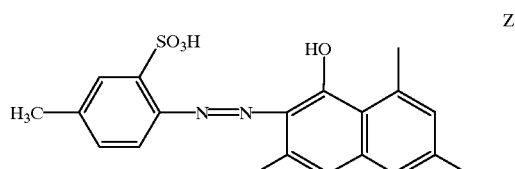
Z1
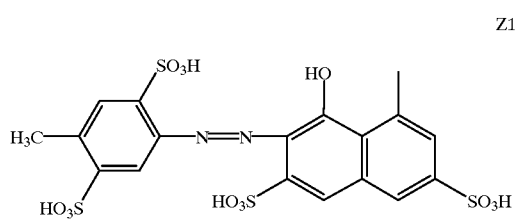
Z2
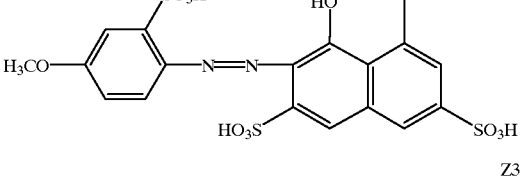
Z3
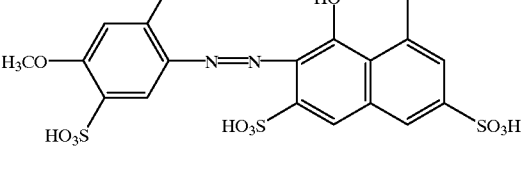
Z4
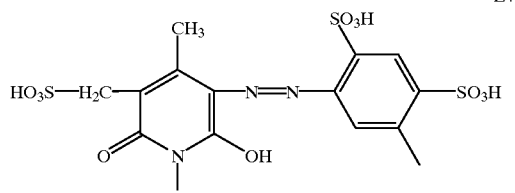
Z5
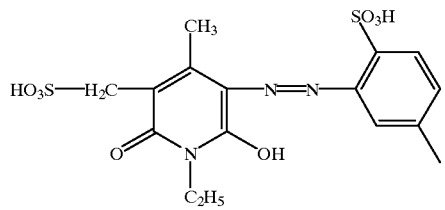

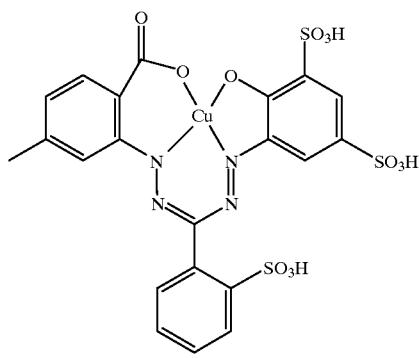

TABLE 1

| Ex. | A₁ | A₂ | n | Y | Colour shade on cotton |
|---|---|---|---|---|---|
| 3 | A | A | 2 | chlorine | yellow |
| 4 | B | B | 2 | chlorine | yellow |
| 5 | C | C | 2 | chlorine | golden yellow |
| 6 | D | D | 3 | chlorine | golden yellow |
| 7 | E | E | 3 | chlorine | orange |
| 8 | F | F | 2 | chlorine | orange |
| 9 | G | G | 3 | chlorine | orange |
| 10 | H | H | 2 | chlorine | orange |
| 11 | I | I | 2 | chlorine | scarlet |
| 12 | J | J | 2 | chlorine | scarlet |
| 13 | K | K | 3 | chlorine | red |
| 14 | L | L | 3 | chlorine | red |
| 15 | M | M | 2 | chlorine | red |
| 16 | N | N | 2 | chlorine | red |
| 17 | O | O | 2 | chlorine | brown |
| 18 | P | P | 3 | chlorine | blue |
| 19 | Q | Q | 3 | chlorine | blue |
| 20 | R | R | 3 | chlorine | blue |
| 21 | S | S | 3 | chlorine | blue |
| 22 | T | T | 3 | chlorine | blue |
| 23 | U | U | 2 | chlorine | navy blue |
| 24 | V | V | 3 | chlorine | turquoise blue |
| 25 | W | W | 2 | chlorine | scarlet |
| 26 | X | X | 2 | chlorine | scarlet |
| 27 | Y | Y | 3 | chlorine | red |
| 28 | Z | Z | 2 | chlorine | red |
| 29 | Z1 | Z1 | 2 | chlorine | red |
| 30 | Z2 | Z2 | 2 | chlorine | bluish-tinged red |
| 31 | Z3 | Z3 | 2 | chlorine | bluish-tinged red |
| 32 | Z4 | Z4 | 3 | chlorine | yellow |
| 33 | Z5 | Z5 | 3 | chlorine | yellow |
| 34 | A | A | 2 | fluorine | yellow |
| 35 | B | B | 2 | fluorine | yellow |
| 36 | C | C | 2 | fluorine | golden yellow |
| 37 | D | D | 3 | fluorine | golden yellow |
| 38 | E | E | 3 | fluorine | orange |
| 39 | F | F | 2 | fluorine | orange |
| 40 | G | G | 3 | fluorine | orange |
| 41 | H | H | 2 | fluorine | orange |
| 42 | I | I | 2 | fluorine | scarlet |
| 43 | J | J | 2 | fluorine | scarlet |
| 44 | K | K | 3 | fluorine | red |
| 45 | L | L | 3 | fluorine | red |
| 46 | M | M | 2 | fluorine | red |
| 47 | N | N | 2 | fluorine | red |
| 48 | O | O | 2 | fluorine | brown |
| 49 | P | P | 3 | fluorine | blue |
| 50 | Q | Q | 3 | fluorine | blue |
| 51 | R | R | 3 | fluorine | blue |
| 52 | S | S | 3 | fluorine | blue |
| 53 | T | T | 3 | fluorine | blue |
| 54 | U | U | 2 | fluorine | navy blue |
| 55 | V | V | 6 | fluorine | turquoise blue |
| 56 | W | W | 2 | fluorine | scarlet |
| 57 | X | X | 2 | fluorine | scarlet |
| 58 | Y | Y | 3 | fluorine | red |
| 59 | Z | Z | 2 | fluorine | red |
| 60 | Z1 | Z1 | 2 | fluorine | red |
| 61 | Z2 | Z2 | 5 | fluorine | bluish-tinged red |
| 62 | Z3 | Z3 | 2 | fluorine | bluish-tinged red |
| 63 | Z4 | Z4 | 3 | fluorine | yellow |
| 64 | Z5 | Z5 | 4 | fluorine | yellow |
| 65 | Z6 | Z6 | 2 | fluorine | blue |
| 66 | A | Q | 2 | chlorine | green |
| 67 | A | R | 1 | chlorine | green |
| 68 | B | D | 3 | chlorine | reddish-tinged yellow |
| 69 | C | D | 2 | fluorine | golden yellow |
| 70 | C | L | 4 | chlorine | reddish-tinged orange |
| 71 | D | R | 2 | chlorine | olive |
| 72 | D | S | 4 | chlorine | olive |
| 73 | E | L | 3 | chlorine | scarlet |
| 74 | E | O | 6 | fluorine | brown |
| 75 | F | H | 7 | chlorine | orange |
| 76 | F | I | 2 | fluorine | reddish-tinged orange |
| 77 | G | H | 3 | chlorine | scarlet |
| 78 | G | I | 5 | chlorine | red-orange |
| 79 | H | Z2 | 2 | chlorine | red |
| 80 | H | Z3 | 2 | chlorine | red |
| 81 | I | M | 4 | chlorine | red |
| 82 | I | N | 3 | chlorine | red |
| 83 | J | Z2 | 2 | chlorine | red |
| 84 | J | Z3 | 3 | chlorine | red |
| 85 | K | L | 3 | fluorine | red |
| 86 | K | M | 2 | chlorine | red |
| 87 | L | S | 2 | chlorine | violet |
| 88 | L | U | 2 | chlorine | violet |
| 89 | Z6 | Z6 | 2 | chlorine | blue |
| 90 | M | V | 2 | chlorine | violet |
| 91 | N | P | 2 | chlorine | violet |
| 92 | N | S | 3 | chlorine | violet |
| 93 | P | T | 3 | chlorine | blue |
| 94 | P | U | 3 | chlorine | blue |
| 95 | Q | R | 3 | fluorine | blue |
| 96 | Q | S | 5 | chlorine | blue |
| 97 | R | T | 2 | chlorine | blue |
| 98 | R | U | 2 | chlorine | blue |
| 99 | S | T | 2 | chlorine | blue |
| 100 | T | U | 4 | chlorine | navy blue |
| 101 | Y | N | 3 | chlorine | red |
| 102 | Z | N | 3 | chlorine | red |
| 103 | Z1 | W | 3 | chlorine | yellowish-tinged red |
| 104 | Z3 | N | 2 | fluorine | bluish-tinged red |
| 105 | Z4 | V | 2 | chlorine | green |
| 106 | Z5 | B | 3 | chlorine | greenish-tinged yellow |

EXAMPLE 107

19 parts of cyanuric chloride are stirred vigorously into 50 parts of water, with the addition of a wetting agent and 5 parts of disodium hydrogen phosphate, at a temperature of 0° C. A neutral solution of 27 parts of 4,6-diaminobenzene-1,3-disulfonic acid in 200 parts of water is added dropwise; during this operation, the pH is kept at a value of 4.5 by addition of sodium hydroxide solution. When the reaction has ended, 25 parts of 32% hydrochloric acid and 7 parts of sodium nitrite are added, the mixture is stirred for 30 minutes and the excess nitrite is destroyed with sulfamic acid. The suspension is added dropwise to a neutral solution of 20 parts of 1-ethyl-6-hydroxy-4-methyl-2-pyridonecarbonylamide in 50 parts of water, during which the pH is kept constant at a value of 7 by addition of an aqueous sodium hydroxide solution. A solution of 4 parts of a diamine of the formula

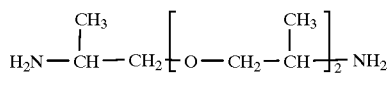

and 5.3 parts of a diamine of the formula

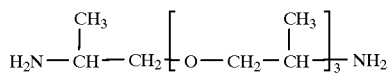

in 30 parts of water is then added dropwise such that the pH does not exceed a value of 9. Towards the end of the reaction, the mixture is then heated to a temperature of 40° C. When the condensation reaction has ended, the resulting product is precipitated by addition of sodium chloride, filtered off with suction and dried. A dye mixture which comprises the dyes, shown in the form of the free acid, of the formulae

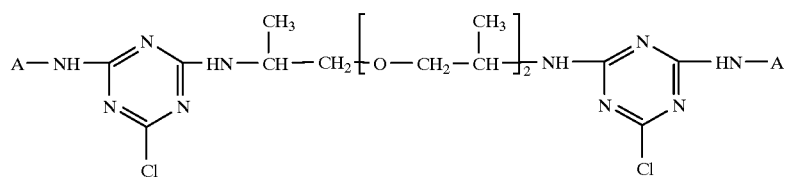

and

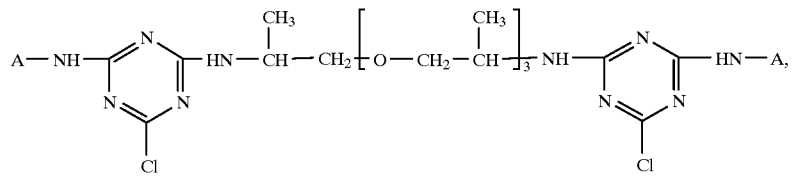

in which

A in each case is a radical of the formula

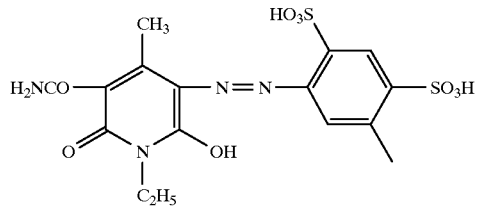

is obtained. The resulting dye mixture dyes cotton in brilliant yellow colour shades.

EXAMPLE 108

14 parts of cyanuric fluoride are added dropwise to a neutral solution of 42 parts of 7-amino-4-hydroxy-3-(2-sulfophenylazo)-naphthalene-2-sulfonic acid and 5 parts of disodium hydrogen phosphate in 500 parts of water at a temperature below 2° C.; during this operation, the pH is kept constant by addition of aqueous sodium hydroxide solution. When the reaction has ended, a solution of 4 parts of a diamine of the formula

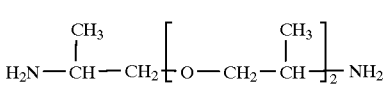

and 5.3 parts of a diamine of the formula

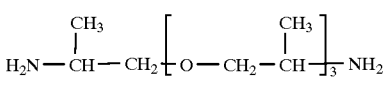

in 30 parts of water are added dropwise such that the pH does not exceed a value of 9.5, and the pH is kept constant at a value of 9.5 by addition of sodium hydroxide solution. The solution is allowed to warm to room temperature and is freed from salt by dialysis and the resulting product is evaporated. A dye mixture which comprises the dyes, shown in the form of the free acid, of the formulae

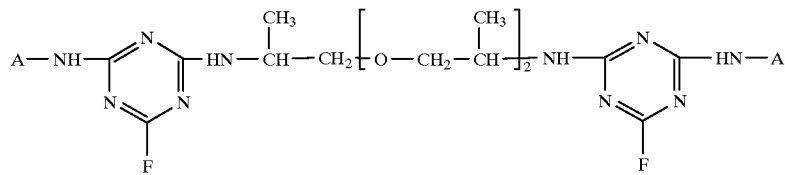

and

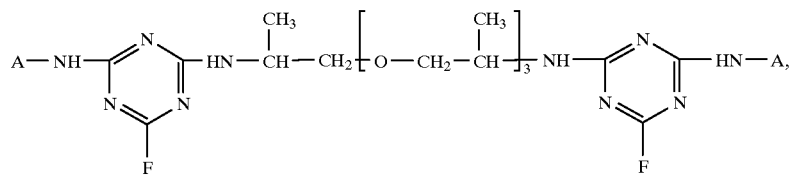

in which

A in each case is a radical of the formula

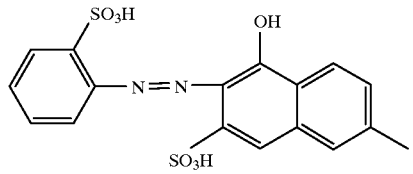

is obtained. The resulting dye mixture dyes cotton in brilliant orange colour shades.

EXAMPLES 109 TO 212

Dye mixtures which comprise, as the main components, the dyes of the formulae

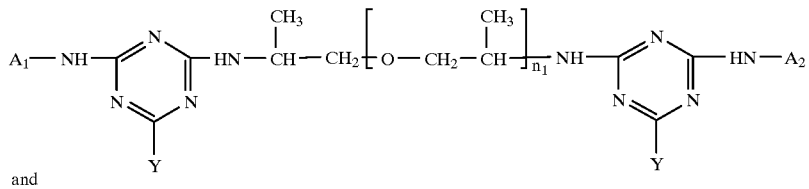

and

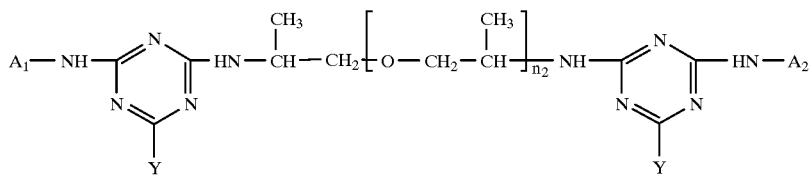

in which $A_2$, Y, $n_1$ and $n_2$ are as defined in columns 2 to 6 in the following Table 2, can be obtained in a manner analogous to the instructions in Example 107 or 108. The dye mixtures dye cotton in the colour shades stated in column 7 in Table 2. The radicals $A_1$ and $A_2$ are designated with letters A to Z6 which are as defined above.

TABLE 2

| Example | $A_1$ | $A_2$ | $n_1$ | $n_2$ | Y | Colour shade on cotton |
|---|---|---|---|---|---|---|
| 109 | A | A | 3 | 2 | chlorine | yellow |
| 110 | B | B | 3 | 2 | chlorine | yellow |
| 111 | C | C | 3 | 2 | chlorine | golden yellow |
| 112 | D | D | 2 | 3 | chlorine | golden yellow |
| 113 | E | E | 2 | 3 | chlorine | orange |
| 114 | F | F | 3 | 2 | chlorine | orange |
| 115 | G | G | 2 | 3 | chlorine | orange |
| 116 | H | H | 3 | 2 | chlorine | orange |
| 117 | I | I | 3 | 2 | chlorine | scarlet |
| 118 | J | J | 3 | 2 | chlorine | scarlet |
| 119 | K | K | 2 | 3 | chlorine | red |
| 120 | L | L | 2 | 3 | chlorine | red |
| 121 | M | M | 3 | 2 | chlorine | red |
| 122 | N | N | 3 | 2 | chlorine | red |

TABLE 2-continued

| Example | $A_1$ | $A_2$ | $n_1$ | $n_2$ | Y | Colour shade on cotton |
|---|---|---|---|---|---|---|
| 123 | O | O | 3 | 2 | chlorine | brown |
| 124 | P | P | 2 | 3 | chlorine | blue |
| 125 | Q | Q | 2 | 3 | chlorine | blue |
| 126 | R | R | 2 | 3 | chlorine | blue |
| 127 | S | S | 2 | 3 | chlorine | blue |
| 128 | T | T | 2 | 3 | chlorine | blue |
| 129 | U | U | 3 | 2 | chlorine | navy blue |
| 130 | V | V | 2 | 3 | chlorine | turquoise blue |

TABLE 2-continued

| Example | $A_1$ | $A_2$ | $n_1$ | $n_2$ | Y | Colour shade on cotton |
|---|---|---|---|---|---|---|
| 131 | W | W | 3 | 2 | chlorine | scarlet |
| 132 | X | X | 3 | 2 | chlorine | scarlet |
| 133 | Y | Y | 2 | 3 | chlorine | red |
| 134 | Z | Z | 3 | 2 | chlorine | red |
| 135 | Z1 | Z1 | 3 | 2 | chlorine | red |
| 136 | Z2 | Z2 | 3 | 2 | chlorine | bluish-tinged red |
| 137 | Z3 | Z3 | 3 | 2 | chlorine | bluish-tinged red |
| 138 | Z4 | Z4 | 2 | 3 | chlorine | yellow |
| 139 | Z5 | Z5 | 2 | 3 | chlorine | yellow |
| 140 | A | A | 1 | 2 | fluorine | yellow |
| 141 | B | B | 4 | 2 | fluorine | yellow |
| 142 | C | C | 5 | 2 | fluorine | golden yellow |
| 143 | D | D | 6 | 3 | fluorine | golden yellow |
| 144 | E | E | 2 | 3 | fluorine | orange |
| 145 | F | F | 3 | 2 | fluorine | orange |
| 146 | G | G | 2 | 3 | fluorine | orange |
| 147 | H | H | 1 | 2 | fluorine | orange |
| 148 | I | I | 3 | 2 | fluorine | scarlet |
| 149 | J | J | 4 | 2 | fluorine | scarlet |
| 150 | K | K | 5 | 3 | fluorine | red |
| 151 | L | L | 2 | 3 | fluorine | red |
| 152 | M | M | 3 | 2 | fluorine | red |
| 153 | N | N | 4 | 2 | fluorine | red |
| 154 | O | O | 3 | 2 | fluorine | brown |
| 155 | P | P | 1 | 3 | fluorine | blue |
| 156 | Q | Q | 2 | 3 | fluorine | blue |
| 157 | R | R | 2 | 3 | fluorine | blue |
| 158 | S | S | 2 | 3 | fluorine | blue |
| 159 | T | T | 2 | 3 | fluorine | blue |
| 160 | U | U | 6 | 2 | fluorine | navy blue |
| 161 | V | V | 1 | 6 | fluorine | turquoise blue |
| 162 | W | W | 3 | 2 | fluorine | scarlet |
| 163 | X | X | 3 | 2 | fluorine | scarlet |
| 164 | Y | Y | 2 | 3 | fluorine | red |
| 165 | Z | Z | 4 | 2 | fluorine | red |
| 166 | Z1 | Z1 | 3 | 2 | fluorine | red |
| 167 | Z2 | Z2 | 2 | 5 | fluorine | bluish-tinged red |
| 168 | Z3 | Z3 | 3 | 2 | fluorine | bluish-tinged red |
| 169 | Z4 | Z4 | 2 | 3 | fluorine | yellow |
| 170 | Z5 | Z5 | 2 | 4 | fluorine | yellow |
| 171 | Z6 | Z6 | 2 | 3 | chlorine | blue |
| 172 | A | R | 2 | 3 | chlorine | green |
| 173 | B | D | 2 | 3 | chlorine | reddish-tinged yellow |
| 174 | C | D | 2 | 3 | fluorine | golden yellow |
| 175 | C | L | 2 | 3 | chlorine | reddish-tinged orange |
| 176 | D | R | 2 | 3 | chlorine | olive |
| 177 | D | S | 2 | 3 | chlorine | olive |
| 178 | E | L | 2 | 3 | chlorine | scarlet |
| 179 | E | O | 2 | 3 | fluorine | brown |
| 180 | F | H | 2 | 3 | chlorine | orange |
| 181 | F | I | 2 | 3 | fluorine | reddish-tinged orange |
| 182 | G | H | 3 | 1 | chlorine | scarlet |
| 183 | G | I | 3 | 4 | chlorine | reddish-orange |
| 184 | H | Z2 | 3 | 2 | chlorine | red |
| 185 | H | Z3 | 3 | 5 | chlorine | red |
| 186 | I | M | 3 | 6 | chlorine | red |
| 187 | I | N | 3 | 2 | chlorine | red |
| 188 | J | Z2 | 3 | 2 | chlorine | red |
| 189 | J | Z3 | 3 | 2 | chlorine | red |
| 190 | K | L | 3 | 2 | fluorine | red |
| 191 | K | M | 3 | 2 | chlorine | red |
| 192 | L | S | 3 | 2 | chlorine | violet |
| 193 | L | U | 3 | 1 | chlorine | violet |
| 194 | M | U | 3 | 2 | chlorine | violet |
| 195 | M | V | 2 | 3 | chlorine | violet |
| 196 | N | P | 2 | 3 | chlorine | violet |
| 197 | N | S | 2 | 3 | chlorine | violet |
| 198 | P | T | 2 | 3 | chlorine | blue |
| 199 | P | U | 2 | 3 | chlorine | blue |
| 200 | Q | R | 2 | 3 | fluorine | blue |
| 201 | Q | S | 2 | 3 | chlorine | blue |
| 202 | R | T | 2 | 3 | chlorine | blue |
| 203 | R | U | 2 | 3 | chlorine | blue |
| 204 | S | T | 2 | 3 | chlorine | blue |
| 205 | T | U | 2 | 3 | chlorine | marineblau |
| 206 | Y | N | 3 | 1 | chlorine | red |
| 207 | Z | N | 3 | 2 | chlorine | red |
| 208 | Z1 | W | 3 | 2 | chlorine | yellowish-tinged red |
| 209 | Z3 | N | 3 | 2 | fluorine | bluish-tinged red |
| 210 | Z4 | V | 3 | 2 | chlorine | green |
| 211 | Z5 | B | 3 | 2 | chlorine | greenish-tinged yellow |
| 212 | Z6 | Z6 | 3 | 2 | fluorine | blue |

If the radicals $A_1$ and $A_2$ in the above Table 2 differ from one another, the starting compounds required for these are employed as an equimolar mixture.

The dye mixtures shown in Table 2 can also be prepared by mixing the individual dyes, it possible for the individual dyes to be obtained analogously to Example 1 or 2.

EXAMPLE 213 a) 19 parts of cyanuric chloride are stirred vigorously into 50 parts of water, with the addition of a wetting agent and 5 parts of disodium hydrogen phosphate, at a temperature of 0° C. A neutral solution of 27 parts of 4,6-diaminobenzene-1,3-disulfonic acid in 200 parts of water is added dropwise, the pH being kept at a value of 4.5 by addition of an aqueous sodium hydroxide solution.

b) 9.5 parts of a diamine of the formula

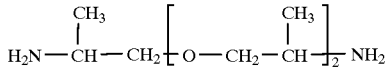

in 30 parts of water are added dropwise at a temperature of 0° C. to the solution obtained as described under a) such that the pH does not exceed a value of 9. The pH is then kept at a value of 9.5 with an aqueous sodium hydroxide solution. Towards the end of the reaction, the mixture is heated to a temperature of 40° C.

c) To prepare a separate solution, 56 parts of 4-(2-sulfatoethylsulfonyl)-phenylamine are suspended in 560 parts of water. 50 parts of 32% hydrochloric acid and 14 parts of sodium nitrite are added and the mixture is stirred for 30 minutes. The excess nitrite is destroyed by addition of a little sulfamic acid. A neutral solution of 64 parts of 3,6-disulfo-8-hydroxy-naphthylamine in 640 parts of water is then added and the pH is increased slowly, until coupling starts, by addition of sodium carbonate. When the coupling reaction has ended, the mixture is neutralized with aqueous sodium hydroxide solution.

d) 25 parts of 32% hydrochloric acid and 7 parts of sodium nitrite are added to the solution obtained according to b) and the mixture is stirred for 30 minutes. The excess nitrite is destroyed by addition of a little sulfamic acid. The resulting diazo compound is added dropwise to the solution obtained according to c), the pH being kept at a value between 6 and 7 by addition of an aqueous sodium hydroxide solution. When the reaction has ended, the solution is desalinated and evaporated in the customary manner. A dye which, in the form of the free acid, is the compound of the formula

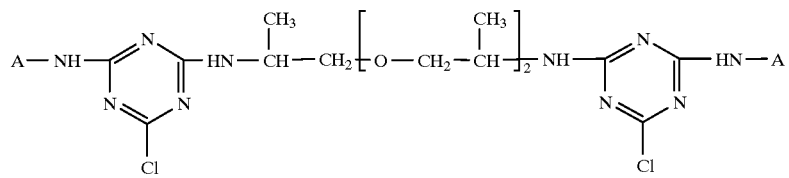

in which

A in each case is a radical of the formula

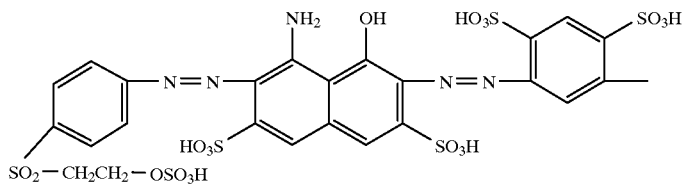

is obtained. The resulting dye dyes cotton in blue colour shades.

EXAMPLE 214 a) 14 parts of cyanuric fluoride are added dropwise to a neutral solution of 27 parts of 4,6-diaminobenzene-1,3-disulfonic acid in 200 parts of water at a temperature of 0° C. The pH is kept at a value of 7 by addition of an aqueous sodium hydroxide solution.

b) 9.5 parts of a diamine of the formula

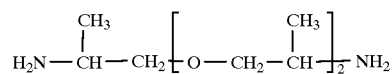

in 30 parts of water are added dropwise, at a temperature of 0° C., to the solution obtained as described under a) such that the pH does not exceed a value of 9. The pH is then kept at a value of 9.5 with an aqueous sodium hydroxide solution. Towards the end of the reaction, the mixture is heated to a temperature of 40° C.

c) To prepare a separate solution, 56 parts of 4-(2-sulfatoethylsulfonyl)-phenylamine are suspended in 560 parts of water. 50 parts of 32% hydrochloric acid and 14 parts of sodium nitrite are added and the mixture is stirred for 30 minutes. The excess nitrite is destroyed by addition of a little sulfamic acid. A neutral solution of 64 parts of 3,6-disulfo-8-hydroxy-naphthylamine in 640 parts of water is then added and the pH is increased slowly, until coupling starts, by addition of sodium carbonate. When the coupling reaction has ended, the mixture is neutralized with aqueous sodium hydroxide solution.

d) 25 parts of 32% hydrochloric acid and 7 parts of sodium nitrite are added to the solution obtained according to b) and the mixture is stirred for 30 minutes. The excess nitrite is destroyed by addition of a little sulfamic acid. The resulting diazo compound is added dropwise to the solution obtained according to c), the pH being kept at a value between 6 and 7 by addition of an aqueous sodium hydroxide solution. When the reaction has ended, the solution is desalinated and evaporated in the customary manner. A dye which, in the form of the free acid, is the compound of the formula

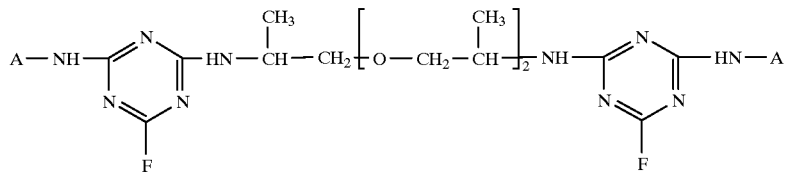

in which

A in each case is a radical of the formula

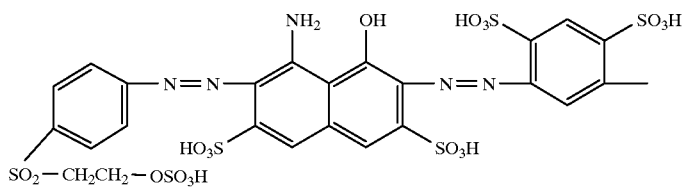

is obtained. The resulting dye dyes cotton in blue colour shades.

EXAMPLE 215 a) 19 parts of cyanuric chloride are stirred vigorously into 50 parts of water, with the addition of a wetting agent and 5 parts of disodium hydrogen phosphate, at a temperature of 0° C. A neutral solution of 27 parts of 4,6-diaminobenzene-1,3-disulfonic acid in 200 parts of water is added dropwise, the pH being kept at a value of 4.5 by addition of an aqueous sodium hydroxide solution.

b) 9.5 parts of a diamine of the formula

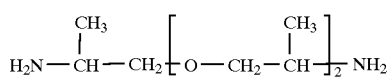

in 30 parts of water are added dropwise, at a temperature of 0° C., to the solution obtained as described under a) such that the pH does not exceed a value of 9. The pH is then kept at a value of 9.5 with an aqueous sodium hydroxide solution. Towards the end of the reaction, the mixture is heated to a temperature of 40° C.

c) 3.1 parts of methylamine are added dropwise to the warm solution of 40° C. obtained according to b). The temperature is increased to 60° C. and the pH is kept at a value of 9.5 with aqueous sodium hydroxide solution.

d) To prepare a separate solution, 56 parts of 4-(2-sulfatoethylsulfonyl)-phenylamine are suspended in 560 parts of water. 50 parts of 32% hydrochloric acid and 14 parts of sodium nitrite are added and the mixture is stirred for 30 minutes. The excess nitrite is destroyed by addition of a little sulfamic acid. A neutral solution of 64 parts of 3,6-disulfo-8-hydroxy-naphthylamine in 640 parts of water is then added and the pH is increased slowly, until coupling starts, by addition of sodium carbonate. When the coupling reaction has ended, the mixture is neutralized with aqueous sodium hydroxide solution.

e) 25 parts of 32% hydrochloric acid and 7 parts of sodium nitrite are added to the solution obtained according to c) and the mixture is stirred for 30 minutes. The excess nitrite is destroyed by addition of a little sulfamic acid. The resulting diazo compound is added dropwise to the solution obtained according to d), the pH being kept at a value between 6 and 7 by addition of an aqueous sodium hydroxide solution. When the reaction has ended, the solution is desalinated and evaporated in the customary manner. A dye which, in the form of the free acid, is the compound of the formula

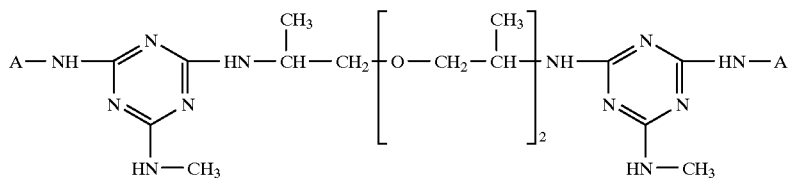

in which
A in each case is a radical of the formula

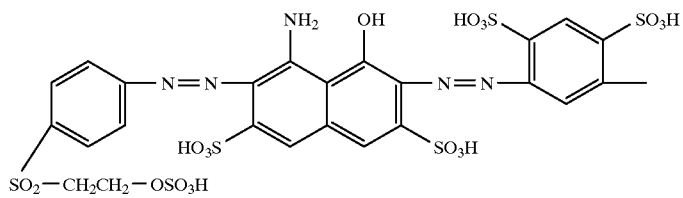

is obtained. The resulting dye dyes cotton in blue colour shades.

EXAMPLES 216 TO 510
Dyes of the formula
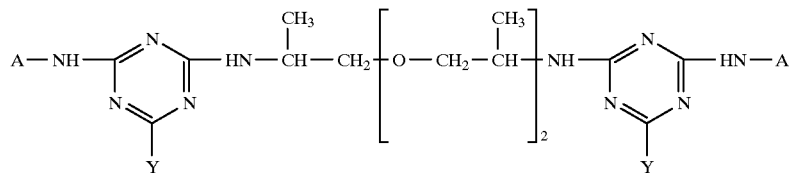
in which
A and Y are as defined in columns 2 and 3 in the following Table 3, can be obtained in a manner analogous to the instructions in Examples 213 to 215. The dyes dye cotton in blue colour shades.

TABLE 3

| Ex. | A | Y |
|---|---|---|
| 216 | [naphthalene with OH, NH₂, SO₃H, azo to tolyl-SO₃H-HO₃S, azo to phenyl-SO₂-CH₂CH₂-OSO₃H, HO₃S] | N-methylmorpholine |
| 217 | [naphthalene with OH, NH₂, SO₃H, azo to tolyl-HO₃S, azo to phenyl-SO₂-CH₂CH₂-OSO₃H, HO₃S] | —Cl |
| 218 | " | —F |
| 219 | " | —N(CH₃)₂ |
| 220 | [naphthalene with OH, NH₂, SO₃H, azo to tolyl-SO₃H-HO₃S, azo to phenyl-SO₃H-SO₂-CH₂CH₂-OSO₃H, HO₃S] | —Cl |
| 221 | " | —F |
| 222 | " | —NHCH₂CH₃ |
| 223 | [naphthalene with OH, NH₂, SO₃H, azo to tolyl-SO₃H-HO₃S, azo to phenyl-SO₃H-SO₂-CH₂CH₂-OSO₃H, HO₃S] | —Cl |
| 224 | " | —F |
| 225 | " | —NH₂ |

TABLE 3-continued

| Ex. | A | Y |
|---|---|---|
| 226 | [structure] | —Cl |
| 227 | " | —F |
| 228 | " | —N(CH₃)CH₂CH₂SO₃H |
| 229 | [structure] | " |
| 230 | " | —Cl |
| 231 | " | —F |
| 232 | [structure] | —NHCH₂CH₂SO₃H |
| 233 | " | —Cl |
| 234 | " | —F, —NH—(CH₂)₂—O—(CH₂)₂—OH |

TABLE 3-continued

| Ex. | A | Y |
|---|---|---|
| 235 | [structure] | —Cl |
| 236 | " | —F |
| 237 | " | —N(CH₃)CH₂CH₂OH |
| 238 | [structure] | —Cl |
| 239 | " | —F |
| 240 | " | —NH—C₆H₅ |
| 241 | [structure] | —Cl |
| 242 | " | —F |

TABLE 3-continued
| Ex. | A | Y |
|---|---|---|
| 243 | 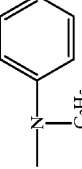 |  |
| 244 | " | —Cl |
| 245 | " | —F |
| 246 | " | —NH—(CH$_2$)$_2$—O—CH$_3$ |
| 247 |  | —Cl |
| 248 | " | —F |
| 249 | " | —NHCH$_2$CH$_2$OH |
| 250 |  | —Cl |
| 251 | " | —F |

TABLE 3-continued

| Ex. | A | Y |
|---|---|---|
| 252 | (complex naphthalene bis-azo structure with OH, NH₂, SO₃H, HO₃S groups, with tolyl-SO₃H and dimethoxy-phenyl-SO₂CH₂CH₂OSO₃H substituents) | —N(CH₂CH₃)(CH₂CH₂OH) |
| 253 | " | —Cl |
| 254 | " | —F |
| 255 | " | —NH—CH₂CH₂—(N-piperidinyl) |
| 256 | (naphthalene bis-azo structure with OH, NH₂, SO₃H, HO₃S and tolyl-SO₃H, phenyl-SO₂CH₂CH₂OSO₃H substituents) | —Cl |
| 257 | " | —F |
| 258 | " | —NH—(CH₂)₃—OH |
| 259 | (naphthalene bis-azo structure with OH, NH₂, SO₃H, HO₃S and tolyl-SO₃H, phenyl-SO₂CH₂CH₂OSO₃H substituents) | —Cl |
| 260 | " | —F |

TABLE 3-continued

| Ex. | A | Y |
|---|---|---|
| 261 | (naphthalene azo dye structure with OH, NH₂, SO₃H, HO₃S, OCH₃, SO₂—CH₂CH₂—OSO₃H substituents) | —N(CH₂CH₂OH)(CH₂CH₂OH) with CH₃ |
| 262 | " | —Cl |
| 263 | | —F |
| 264 | (naphthalene azo dye structure) | morpholino (N-linked) |
| 265 | " | —Cl |
| 266 | (naphthalene azo dye structure with Cl substituent) | —F |
| 267 | | —N(CH₃)₂ |
| 268 | | —Cl |

TABLE 3-continued

| Ex. | A | Y |
|---|---|---|
| 269 | [naphthalene bis-azo dye structure with Cl-phenyl and tolyl groups] | —F |
| 270 | " | —NHCH$_2$CH$_3$ |
| 271 | " | —Cl |
| 272 | [naphthalene bis-azo dye structure with Br-phenyl and tolyl groups] | —F |
| 273 | " | —N(CH$_3$)CH$_2$CH$_2$SO$_3$H |
| 274 | " | —Cl |
| 275 | [naphthalene bis-azo dye structure with Br-phenyl and tolyl groups] | —F |
| 276 | " | —NH$_2$ |
| 277 | " | —Cl |
| 278 | " | —F |
| 279 | " | —NH—(CH$_2$)$_2$—O—(CH$_2$)$_2$—OH |

TABLE 3-continued

| Ex. | A | Y |
|---|---|---|
| 280 | [naphthol-amino disulfo azo coupled to sulfophenyl and to naphthyl-SO₂CH₂CH₂OSO₃H] | —Cl |
| 281 | " | —F |
| 282 | " | —N(CH₃)CH₂CH₂OH |
| 283 | [naphthol-amino disulfo azo coupled to methyl-sulfophenyl and to naphthyl-SO₂CH₂CH₂OSO₃H] | —Cl |
| 284 | " | —F |
| 285 | " | —NH-phenyl |
| 286 | [naphthol-amino disulfo azo coupled to methyl-sulfophenyl and to sulfo-naphthyl-SO₂CH₂CH₂OSO₃H] | —Cl |
| 287 | " | —F |

TABLE 3-continued

| Ex. | A | Y |
|---|---|---|
| 288 | (H-acid bis-azo with tolyl-SO₃H and naphthyl-SO₃H/SO₂CH₂CH₂OSO₃H substituents) | —N(CH₃)(C₂H₅)—C₆H₅ |
| 289 | " | —Cl |
| 290 | (H-acid bis-azo with tolyl-SO₃H/HO₃S and naphthyl-SO₂CH₂CH₂OSO₃H substituents) | —F |
| 291 | | —NH—(CH₂)₂—O—CH₃ |
| 292 | " | —Cl |
| 293 | (H-acid bis-azo with tolyl-SO₃H/HO₃S and naphthyl-SO₂CH₂CH₂OSO₃H substituents) | —F |
| 294 | | —NHCH₂CH₂OH |
| 295 | " | —Cl |
| 296 | " | —F |

TABLE 3-continued
| Ex. | A | Y |
|---|---|---|
| 297 | " |  |
| 298 | 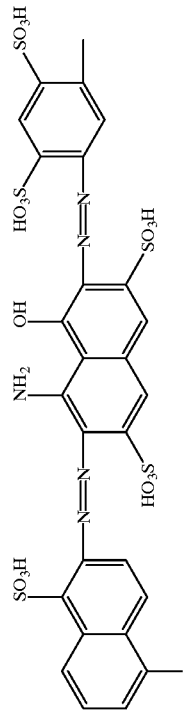 | —Cl |
| 299 | " | —F |
| 300 | " |  |
| 301 |  | —Cl |
| 302 | " | —F |
| 303 | " | —NH—(CH$_2$)$_3$—OH |
| 304 | 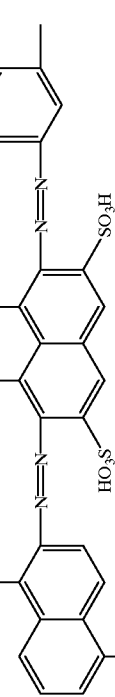 | —Cl |
| 305 | " | —F |

TABLE 3-continued

| Ex. | A | Y |
|---|---|---|
| 306 | " | —N(CH₂CH₂OH)(CH₂CH₂OH) |
| 307 | [naphthalene-azo-naphthalene structure with SO₂CH₂CH₂OSO₃H, OH, NH₂, HO₃S, SO₃H substituents and tolyl group] | —Cl |
| 308 | " | —F |
| 309 | " | N-methylmorpholine |
| 310 | [naphthalene-azo-phenyl structure with OH, NH₂, SO₃H, HO₃S, NHCO—CHBr—CH₂Br, tolyl with SO₃H] | " |
| 311 | " | —Cl |
| 312 | " | —F |
| 313 | [naphthalene-azo-phenyl structure with OH, NH₂, SO₃H, HO₃S, NHCO—CHBr—CH₂Br, tolyl with SO₃H] | —N(CH₃)₂ |
| 314 | " | —Cl |
| 315 | " | —F |
|  | " | —NHCH₂CH₃ |

TABLE 3-continued

| Ex. | A | Y |
|---|---|---|
| 316 | [naphthalene bis-azo structure with NH₂, OH, SO₃H groups; tolyl-SO₃H substituent; NH—CO—CHBr—CH₂Br] | —Cl |
| 317 | " | —F |
| 318 | " | —N(CH₃)—CH₂CH₂SO₃H |
| 319 | [naphthalene bis-azo structure with NH₂, OH, SO₃H groups; tolyl substituent; NH—CO—CHBr—CH₂Br] | —Cl |
| 320 | " | —F |
| 321 | " | —NHCH₂CH₂SO₃H |
| 322 | [naphthalene bis-azo structure with NH₂, OH, SO₃H, SO₃H groups; tolyl-SO₃H substituent; BrH₂C—BrHC—CO—NH—phenyl(SO₃H)₂] | —Cl |
| 323 | " | —F |
| 324 | " | —NH—(CH₂)₂—O—(CH₂)₂—OH |

TABLE 3-continued

| Ex. | A | Y |
|---|---|---|
| 325 | (structure) | —Cl |
| 326 | " | —F |
| 327 | " | —NH$_2$ |
| 328 | (structure) | —Cl |
| 329 | " | —F |
| 330 | " | —NHPh |
| 331 | (structure) | —Cl |
| 332 | " | —F |

TABLE 3-continued
| Ex. | A | Y |
|---|---|---|
| 333 | 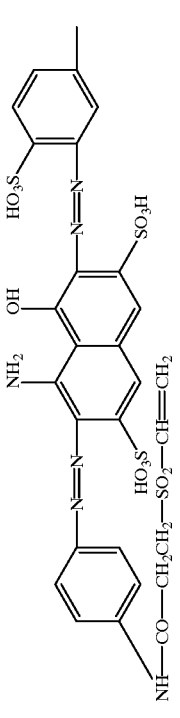 | 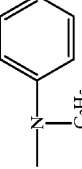 |
| 334 | " | —Cl |
| 335 336 | 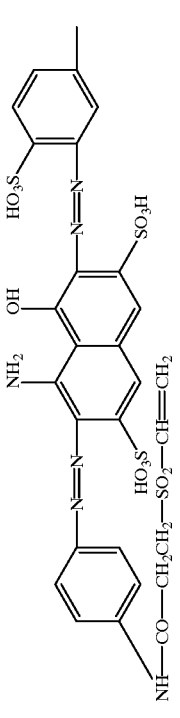 | —F —NH—(CH$_2$)$_2$—O—CH$_3$ |
| 337 | " | —Cl |
| 338 339 | 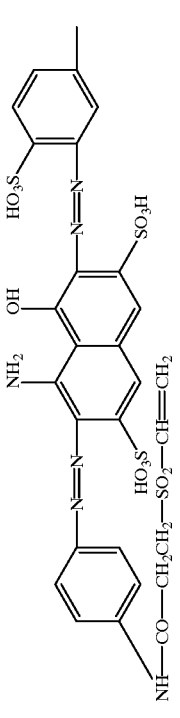 | —F —NHCH$_2$CH$_2$OH |
| 340 | " | —Cl |
| 341 342 | " | —F 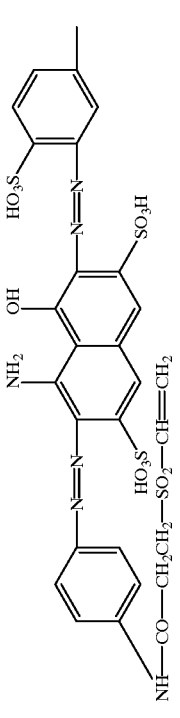 |

TABLE 3-continued

| Ex. | A | Y |
|---|---|---|
| 343 | [naphthalene structure with OH, NH₂, SO₃H groups, azo-linked to tolyl-SO₃H and to phenyl(SO₃H)-NH-CO-CH₂CH₂-SO₂-CH=CH₂] | —Cl |
| 344 | " | —F |
| 345 | " | —NH—CH₂CH₂—N(piperidine) |
| 346 | [naphthalene structure with OH, NH₂, SO₃H groups, azo-linked to tolyl-SO₃H and to phenyl(SO₃H)-NH-CO-CH₂CH₂-SO₂-CH=CH₂] | —Cl |
| 347 | " | —F |
| 348 | | —NH—(CH₂)₃—OH |
| 349 | | —Cl |
| 350 | [naphthalene structure with OH, NH₂, SO₃H groups, azo-linked to tolyl-SO₃H and to phenyl(SO₃H)-NH-CO-CH₂CH₂-SO₂-CH=CH₂] | —F |
| 351 | " | —N(CH₂CH₂OH)₂ |

TABLE 3-continued

| Ex. | A | Y |
|---|---|---|
| 352 | (naphthalene with OH, NH₂, SO₃H groups; azo-linked to tolyl-SO₃H-HO₃S and to phenyl-SO₃H-SO₃H with NH—CO—CH₂CH₂—SO₂—CH=CH₂) | —Cl |
| 353 |  | —F |
| 354 |  | N-methylmorpholine |
| 355 | (naphthalene with OH, NH₂, SO₃H groups; azo-linked to tolyl-HO₃S and to phenyl-SO₃H-SO₃H with NH—CO—CH₂CH₂—SO₂—CH=CH₂) | —Cl |
| 356 | " | —F |
| 357 | " | —N(CH₃)₂ |
| 358 | (naphthalene with OH, NH₂, SO₃H groups; azo-linked to tolyl-SO₃H-HO₃S and to phenyl-SO₃H-HO₃S with NH—CO—CH₂CH₂—SO₂—CH=CH₂) | —Cl |
| 359 | " | —F |
| 360 | " | —NHCH₂CH₃ |

TABLE 3-continued

| Ex. | A | Y |
|---|---|---|
| 361 | (naphthalene-based azo dye structure with OH, NH₂, SO₃H groups, azo-linked to tolyl-SO₃H and to phenyl with SO₃H, SO₃H and NH—CO—CH₂CH₂—SO₂—CH=CH₂) | —Cl |
| 362 | " | —F |
| 363 | " | —N(CH₃)—CH₂CH₂SO₃H |
| 364 | (naphthalene-based azo dye with OH, NH₂, SO₃H, SO₃H groups, azo-linked to tolyl-SO₃H and to phenyl-SO₃H with SO₂—CH₂CH₂—OSO₃H) | —Cl |
| 365 | " | —F |
| 366 | " | —NHCH₂CH₂SO₃H |
| 367 | (naphthalene-based azo dye with OH, NH₂, SO₃H, SO₃H groups, azo-linked to tolyl-SO₃H and to phenyl-SO₃H with SO₂—CH₂CH₂—OSO₃H) | —Cl |
| 368 | " | —F |
| 369 | " | —NH—(CH₂)₂—O—(CH₂)₂—OH |

TABLE 3-continued

| Ex. | A | Y |
|---|---|---|
| 370 | (structure) | —Cl |
| 371 | " | —F |
| 372 | " | —N(CH₂CH₂OH)(CH₃) |
| 373 | (structure) | " |
| 374 | " | —Cl |
| 375 | " | —F |
| 376 | (structure) | —NH—C₆H₅ |
| 377 | " | " |
|  | " | —Cl |
|  | " | —F |

TABLE 3-continued
| Ex. | A | Y |
|---|---|---|
| 378 | " | 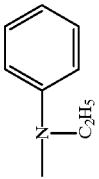 |
| 379 | " | —Cl |
| 380 | 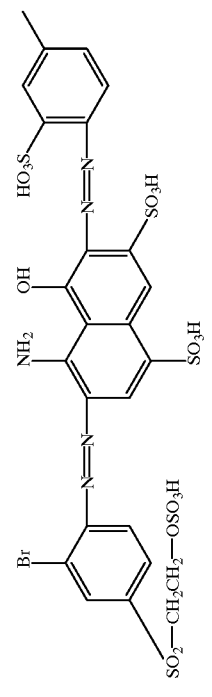 | —F |
| 381 | | —NH—(CH$_2$)$_2$—O—CH$_3$ |
| 382 | 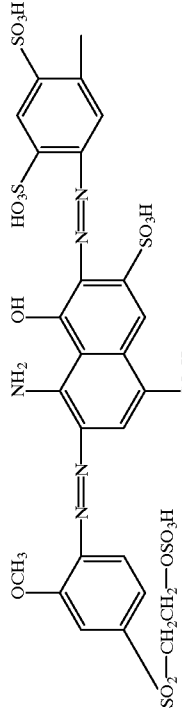 | —Cl |
| 383 | 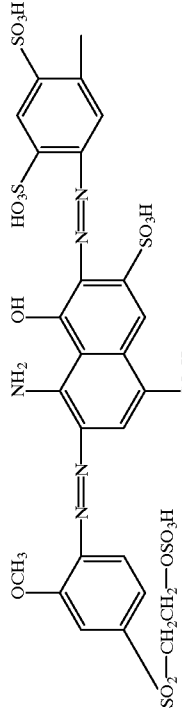 | —F |
| 384 | | —NHCH$_2$CH$_2$OH |
| 385 | " | —Cl |
| 386 | " | —F |

TABLE 3-continued

| Ex. | A | Y |
|---|---|---|
| 387 | (complex naphthalene azo structure with OH, NH₂, SO₃H, and azo-linked aryl groups bearing OCH₃, CH₃, and SO₂CH₂CH₂OSO₃H) | —N(CH₂CH₃)(CH₂CH₂OH) |
| 388 | " | —Cl |
| 389 | " | —F |
| 390 | " | —NH—CH₂CH₂—(piperidinyl) |
| 391 | (similar naphthalene azo structure) | —Cl |
| 392 | " | —F |
| 393 | " | —NH—(CH₂)₃—OH |
| 394 | (similar naphthalene azo structure with OCH₃ groups) | —Cl |
| 395 | " | —F |

TABLE 3-continued

| Ex. | A | Y |
|---|---|---|
| 396 | [naphthalene bis-azo structure with OH, NH₂, SO₃H groups; one azo linked to 2,5-dimethoxy-4-(CH₂CH₂OSO₃H-sulfonyl)phenyl; other azo linked to 2-sulfo-4-methylphenyl] | —N(CH₂CH₂OH)₂ |
| 397 | " | " |
| 398 | " | —Cl |
| 399 | " | —F |
| 400 | [naphthalene bis-azo structure with OH, NH₂, SO₃H groups; one azo linked to 3-(SO₂CH₂CH₂OSO₃H)phenyl; other azo linked to 2-sulfo-4-methylphenyl] | N-methylmorpholine (4-methylmorpholin-yl) |
| 401 | " | —Cl |
| 402 | | —F |
| | | —N(CH₃)₂ |

TABLE 3-continued

| Ex. | A | Y |
|---|---|---|
| 403 | (naphthalene with OH, NH2, SO3H, azo to tolyl-SO3H/HO3S, azo to phenyl-SO2CH2CH2OSO3H) | —Cl |
| 404 | " | —F |
| 405 | " | —NHCH2CH3 |
| 406 | (naphthalene with OH, NH2, SO3H, azo to tolyl-SO3H/HO3S, azo to OCH3-phenyl-SO2CH2CH2OSO3H) | —Cl |
| 407 | " | —F |
| 408 | " | —N(CH3)CH2CH2SO3H |
| 409 | (naphthalene with OH, NH2, SO3H, azo to tolyl-HO3S, azo to OCH3-phenyl-SO3H) | —Cl |
| 410 | " | —F |
| 411 | " | —NHCH2CH2SO3H |

TABLE 3-continued

| Ex. | A | Y |
|---|---|---|
| 412 | (structure) | —Cl |
| 413 | " | —F |
| 414 | " | —NH—(CH$_2$)$_2$—O—(CH$_2$)$_2$—OH |
| 415 | (structure) | —Cl |
| 416 | " | —F |
| 417 | " | —N(CH$_3$)—CH$_2$CH$_2$OH |
| 418 | (structure) | —Cl |
| 419 | " | —F |

TABLE 3-continued
| Ex. | A | Y |
|---|---|---|
| 420 | | —NH—C₆H₅ |
| 421 | " | —Cl |
| 422 | 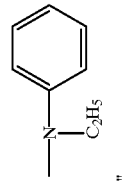 | —F |
| 423 | " | —N(C₂H₅)—C₆H₅ |
| 424 | " | —Cl |
| 425 |  | —F |
| 426 | " | —NH—(CH₂)₂—O—CH₃ |

TABLE 3-continued

| Ex. | A | Y |
|---|---|---|
| 427 | [naphthalene structure with OH, NH₂, SO₃H substituents, azo-linked to tolyl-SO₃H and to naphthyl-SO₂—CH₂CH₂—OSO₃H] | —Cl |
| 428 | " | —F |
| 429 | " | —NHCH₂CH₂OH |
| 430 | [naphthalene structure with OH, NH₂, SO₃H substituents, azo-linked to tolyl-SO₃H and to naphthyl(SO₃H)—SO₂—CH₂CH₂—OSO₃H] | —Cl |
| 431 | " | —F |
| 432 | " | —N(CH₂CH₃)(CH₂CH₂OH) |
| 433 | " | " |
| | [naphthalene structure with OH, NH₂, SO₃H substituents, azo-linked to tolyl-SO₃H and to naphthyl(SO₃H)—SO₂—CH₂CH₂—OSO₃H] | —Cl |
| 434 | " | —F |
| 435 | " | —NH—CH₂CH₂—N(piperidine) |

TABLE 3-continued

| Ex. | A | Y |
|---|---|---|
| 436 | (structure) | —Cl |
| 437 | " | —F |
| 438 | | —NH—(CH$_2$)$_3$—OH |
| 439 | (structure) | —Cl |
| 440 | " | —F |
| 441 | | —N(CH$_2$CH$_2$OH)$_2$ |
| 442 | (structure) | —Cl |
| 443 | " | —F |

TABLE 3-continued
| Ex. | A | Y |
|---|---|---|
| 444 |  | 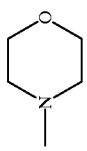 |
| 445 | 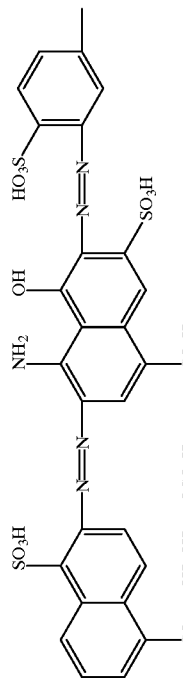 | " |
|  |  | —Cl |
| 446 |  | —F |
| 447 |  | —N(CH$_3$)$_2$ |
| 448 | 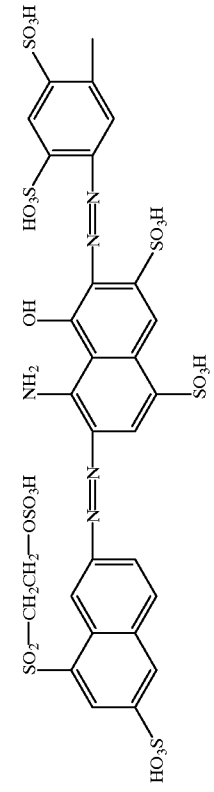 | —Cl |
| 449 |  | —F |
| 450 |  | —NHCH$_2$CH$_3$ |
| 451 | 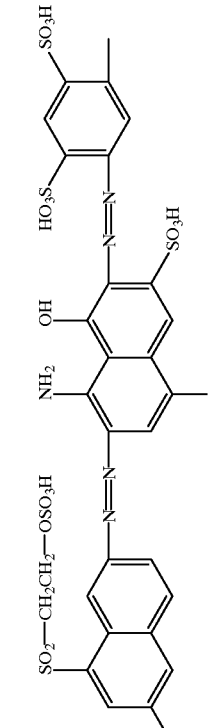 | —Cl |
| 452 | " | —F |

TABLE 3-continued
| Ex. | A | Y |
|---|---|---|
| 453 |  | —N(CH₃)—CH₂CH₂SO₃H |
| 454 | " | " |
|  |  | —Cl |
| 455 |  | —F |
| 456 |  | —NHCH₂CH₂SO₃H |
| 457 | " | —Cl |
|  | 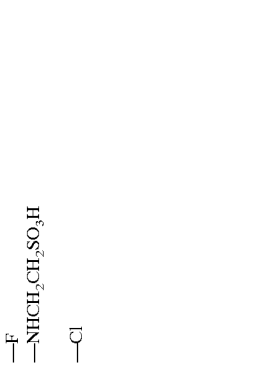 |  |
| 458 |  | —F |
| 459 |  | —NH—(CH₂)₂—O—(CH₂)₂—OH |
| 460 | " | —Cl |
| 461 |  | —F |

TABLE 3-continued

| Ex. | A | Y |
|---|---|---|
| 462 | | —N(CH₃)—CH₂CH₂OH |
| 463 | (structure) | —Cl |
| 464 | " | —F |
| 465 | " | —NH—C₆H₅ |
| 466 | (structure) | —Cl |
| 467 | " | —F |
| 468 | " | —N(C₂H₅)—C₆H₅ |

TABLE 3-continued

| Ex. | A | Y |
|---|---|---|
| 469 | (naphthalene bis-azo structure with OH, NH₂, SO₃H groups; azo-linked to HO₃S-tolyl-SO₃H and to SO₃H/SO₃H-phenyl-NH-CO-CHBr-CH₂Br) | —Cl |
| 470 | " | —F |
| 471 | " | —NH—(CH₂)₂—O—CH₃ |
| 472 | (naphthalene structure with OH, NH₂, SO₃H; azo to HO₃S-tolyl-SO₃H and to SO₃H/HO₃S-phenyl-NH-CO-CHBr-CH₂Br) | —Cl |
| 473 | " | —F |
| 474 | " | —NHCH₂CH₂OH |
| 475 | (naphthalene structure with OH, NH₂, SO₃H; azo to HO₃S-tolyl-SO₃H and to SO₃H/HO₃S-phenyl-NH-CO-CHBr-CH₂Br) | —Cl |
| 476 | " | —F |
| 477 | " | —N(CH₂CH₃)(CH₂CH₂OH) |

TABLE 3-continued

| Ex. | A | Y |
|---|---|---|
| 478 | [naphthalene with OH, NH₂, SO₃H groups, azo-linked to tolyl-SO₃H/HO₃S and to phenyl-NHCO-CH₂CH₂-SO₂-CH=CH₂] | —Cl |
| 479 | " | —F |
| 480 | " | —NH—CH₂CH₂—N(piperidine) |
| 481 | [naphthalene with OH, NH₂, SO₃H groups, azo-linked to tolyl-HO₃S and to phenyl(SO₃H)-NHCO-CH₂CH₂-SO₂-CH=CH₂] | —Cl |
| 482 | " | —F |
| 483 | " | —NH—(CH₂)₅—OH |
| 484 | [naphthalene with OH, NH₂, SO₃H groups, azo-linked to tolyl-SO₃H/HO₃S and to phenyl(SO₃H)-NHCO-CH₂CH₂-SO₂-CH=CH₂] | —Cl |
| 485 | " | —F |

TABLE 3-continued

| Ex. | A | Y |
|---|---|---|
| 486 | " | –N(CH₂CH₂OH)(CH₂CH₂OH) with CH₃ |
| 487 | (naphthalene bis-azo structure with OH, NH₂, SO₃H, NH–CO–CH₂CH₂–SO₂–CH=CH₂ substituents; azo-linked to tolyl-SO₃H and to phenyl-SO₃H) | —Cl |
| 488 | " | —F |
| 489 | " | N-methylmorpholine |
| 490 | (naphthalene bis-azo structure with OH, NH₂, SO₃H, NH–CO–CH₂CH₂–SO₂–CH=CH₂ substituents; azo-linked to tolyl-SO₃H and to phenyl-SO₃H) | —Cl |
| 491 | " | —F |
| 492 | " | —N(CH₃)₂ |

TABLE 3-continued

| Ex. | A | Y |
|---|---|---|
| 493 | (structure) | —Cl |
| 494 | " | —F |
| 495 | | —NHCH₂CH₃ |
| 496 | (structure) | —Cl |
| 497 | " | —F |
| 498 | " | —N(CH₃)CH₂CH₂SO₃H |
| 499 | (structure) | —Cl |
| 500 | " | —F |
| 501 | | —NHCH₂CH₂SO₃H |

TABLE 3-continued

| Ex. | A | Y |
|---|---|---|
| 502 | (naphthalene with OH, NH₂, SO₃H groups, azo-linked to tolyl-SO₃H and to phenyl-SO₃H with NH—CO—CH₂CH₂—SO₂—CH=CH₂) | —Cl |
| 503 | " | —F |
| 504 | | —NH—(CH₂)₂—O—(CH₂)₂—OH |
| 505 | (naphthalene with OH, NH₂, SO₃H groups, azo-linked to tolyl-SO₃H and to phenyl-SO₃H with NH—CO—CH₂CH₂—SO₂—CH=CH₂) | —Cl |
| 506 | " | —F |
| 507 | | —N(CH₃)(CH₂CH₂OH) |
| 508 | (naphthalene with OH, NH₂, SO₃H groups, azo-linked to tolyl-SO₃H and to phenyl-SO₂—CH₂CH₂—OSO₃H) | —Cl |
| 509 | " | —F |

TABLE 3-continued
| Ex. | A | Y |
|---|---|---|
| 510 | " | 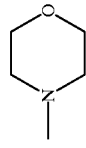 " |

Dyeing instructions 2 parts of the dye mixture obtained according to Example 108 are dissolved in 400 parts of water; 1500 parts of a solution which comprises 53 g of sodium chloride per liter are added. 100 parts of cotton fabric are introduced into this dyebath at 40° C. After 45 minutes, 100 parts of a solution which comprises 16 g of sodium hydroxide and 20 g of calcined sodium carbonate per liter are added. The temperature of the dyebath is kept at 40° C. for a further 45 minutes. The dyed goods are then rinsed, soaped at the boil with a nonionic detergent for quarter of an hour, rinsed again and dried.

Printing instructions 3 parts of the dye mixture obtained according to Example 108 are sprinkled, with rapid stirring, into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained and is dried, and the resulting printed material is steamed in saturated steam at 102° C. for 2 minutes. The printed fabric is then rinsed, if appropriate soaped at the boil and rinsed again, and then dried.

What is claimed is:

1. A dye of the formula

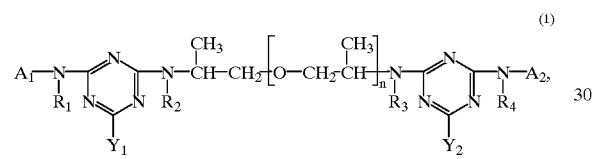
(1)

in which
  $A_1$ and $A_2$ independently of one another are radicals of the formulae

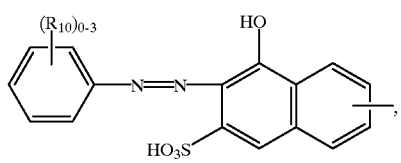
(8a)

in which
  $R_{10}$ is 0 to 3 identical or different substituents selected from $C_1$–$C_4$ alkyl, $C_1$–$C_4$ alkoxy, halogen, carboxyl and sulfo,

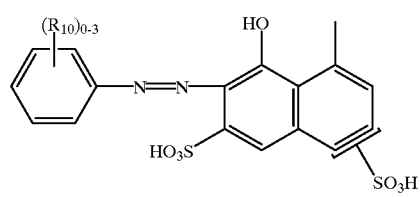
(8b)

in which
  $R_{10}$ is 0 to 3 identical or different substituents selected from $C_1$–$C_4$ alkyl, $C_1$–$C_4$ alkoxy, halogen, carboxyl and sulfo,

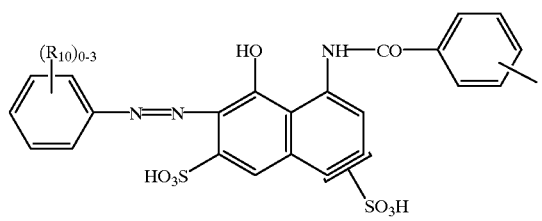
(8c)

in which
  $R_{10}$ is 0 to 3 identical or different substituents selected from $C_1$–$C_4$ alkyl, $C_1$–$C_4$ alkoxy, halogen, carboxyl and sulfo,

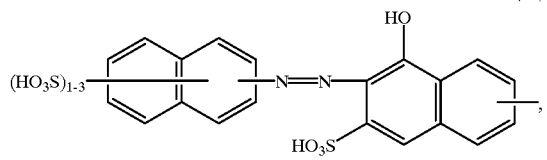
(8d)

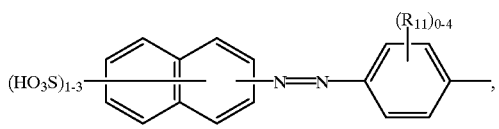
(8e)

in which
  $R_{11}$ is 0 to 4 identical or different substituents selected from halogen, nitro, cyano, trifluoromethyl, sulfamoyl, carbamoyl, $C_1$–$C_4$ alkyl, $C_1$–$C_4$ alkoxy, amino, acetylamino, ureido, hydroxyl, carboxyl, sulfomethyl and sulfo,

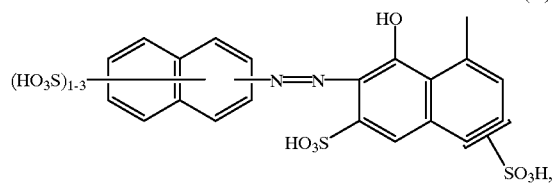
(8f)

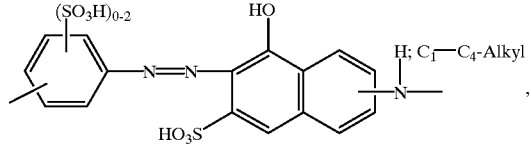
(8g)

in which
  $R_{12}$ is $C_1$–$C_4$ alkanoyl, benzoyl or a halogenotriazinyl radical which is unsubstituted or further substituted,

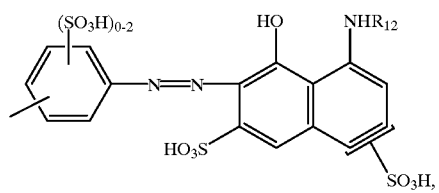

(8h)

in which $R_{12}$ is $C_1$–$C_4$ alkanoyl, benzoyl or a halogenotriazinyl radical which is unsubstituted or further substituted,

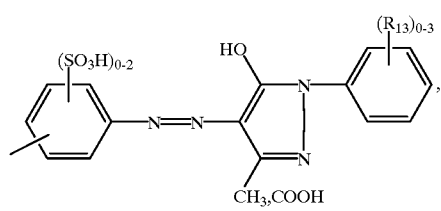

(8i)

in which $R_{13}$ is 0 to 3 identical or different substituents selected from $C_1$–$C_4$ alkyl, $C_1$–$C_4$ alkoxy, halogen, carboxyl and sulfo,

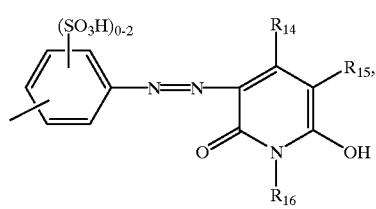

(8j)

in which $R_{14}$ and $R_{16}$ independently of one another are hydrogen, $C_1$–$C_4$ alkyl or phenyl, and $R_{15}$ is hydrogen, cyano, carbamoyl or sulfomethyl,

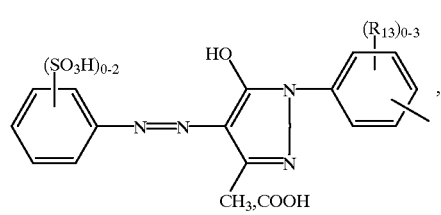

(8k)

in which $R_{13}$ is 0 to 3 identical or different substituents selected from $C_1$–$C_4$ alkyl, $C_1$–$C_4$ alkoxy, halogen, carboxyl and sulfo,

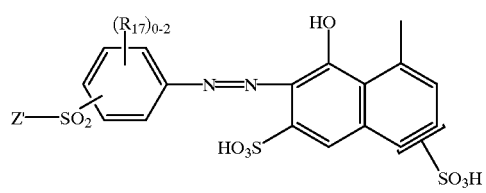

(8l)

in which $R_{17}$ is 0 to 2 identical or different substituents selected from $C_1$–$C_4$ alkyl, $C_1$–$C_4$ alkoxy, halogen, carboxyl and sulfo; and Z' is β-sulfatoethyl, β-thiosulfatoethyl, β-phosphatoethyl, β-acyloxyethyl, β-haloethyl or vinyl,

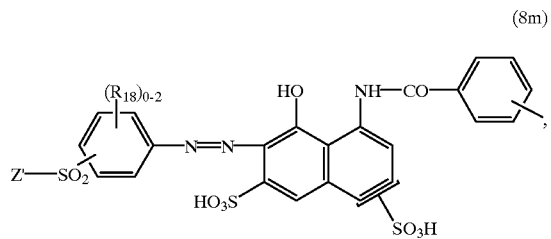

(8m)

in which $R_{18}$ is 0 to 2 identical or different substituents selected from $C_1$–$C_4$ alkyl, $C_1$–$C_4$ alkoxy, halogen, carboxyl and sulfo; and Z' is β-sulfatoethyl, β-thiosulfatoethyl, β-phosphatoethyl, β-acyloxyethyl, β-haloethyl or vinyl,

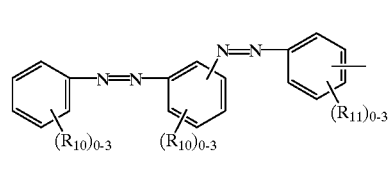

(8n)

or

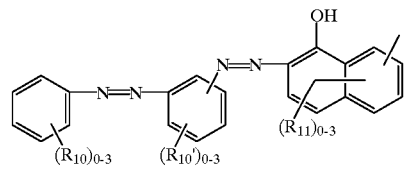

(8o)

or

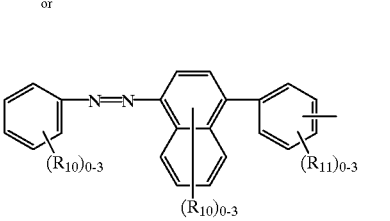

(8p)

or

-continued

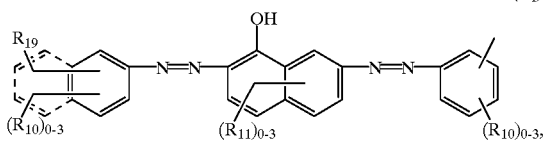
(8q)

in which $R_{10}$ is 0 to 3 identical or different substituents selected from $C_1$–$C_4$ alkyl, $C_1$–$C_4$ alkoxy, halogen, carboxyl and sulfo, $R_{10}'$ is 0 to 2 identical or different substituents selected from $C_1$–$C_4$ alkyl, $C_1$–$C_4$ alkoxy, halogen, carboxyl and sulfo, $C_1$–$C_4$ hydroxyalkoxy or $C_1$–$C_4$ sulfatoalkoxy, $R_{11}$ is 0 to 3 identical or different substituents selected from halogen, nitro, cyano, trifluoromethyl, sulfamoyl, carbamoyl, $C_1$–$C_4$ alkyl, $C_1$–$C_4$ alkoxy, amino, acetylamino, ureido, hydroxyl, carboxyl, sulfomethyl and sulfo and $R_{19}$ is hydrogen or a radical of the formula —$SO_2Z'$, —NH—CO—$(CH_3)_{2-3}$—$SO_2Z'$, —NH—CO—C(Hal)=$CH_2$ or —NH—CO—CH(Hal)—$CH_2$—Hal, in which $Z'$ is β-sulfatoethyl, β-thiosulfatoethyl, β-phosphatoethyl, β-acyloxyethyl, β-haloethyl or vinyl and Hal is halogen,

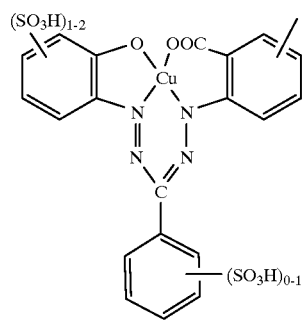
(8r)

or

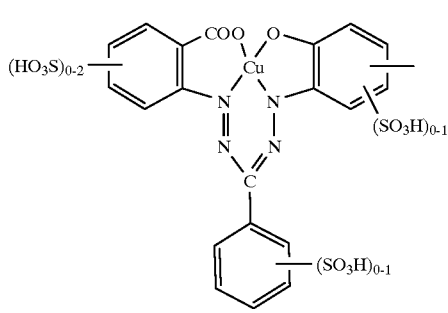
(8s)

or

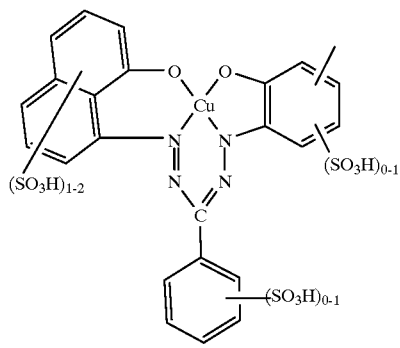
(8t)

or

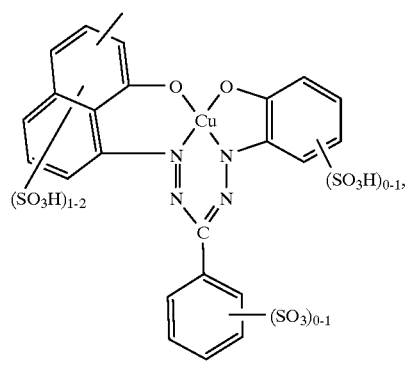
(8u)

in which the benzene nuclei contain no further substituents or are further substituted by $C_1$–$C_4$ alkyl, $C_1$–$C_4$ alkoxy, $C_1$–$C_4$ alkylsulfonyl, halogen or carboxyl,

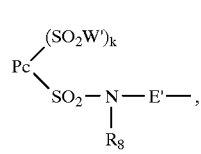
(9)

in which

Pc is a radical of a metal phthalocyanine;

$W'$ is —OH and/or —$NR_9R_9'$;

$R_9$ and $R_9'$ independently of one another are hydrogen or $C_1$–$C_4$alkyl which is unsubstituted or substituted by hydroxyl or sulfo;

$R_8$ is hydrogen or $C_1$–$C_4$alkyl;

$E'$ is a phenylene radical which is unsubstituted or substituted by $C_1$–$C_4$ alkyl, halogen, carboxyl or sulfo, or a $C_2$–$C_6$ alkylene radical; and k is 1 to 3,

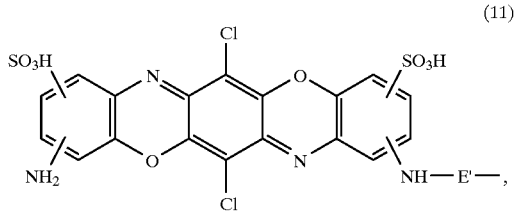

(11)

in which

E' is a phenylene radical which is unsubstituted or substituted by $C_1$–$C_4$ alkyl, halogen, carboxyl or sulfo, or a $C_2$–$C_6$ alkylene radical; and the outer benzene rings in formula (10) contain no further substituents or are further substituted by $C_1$–$C_4$ alkyl, $C_1$–$C_4$ alkoxy, acetylamino, nitro, halogen, carboxyl, sulfo or —$SO_2$—Z', in which Z' is β-sulfatoethyl, β-thiosulfatoethyl, β-phosphatoethyl, β-acyloxyethyl, β-haloethyl or vinyl or

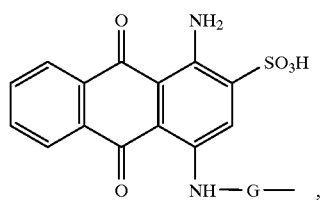

(II)

in which

G is a phenylene, cyclohexylene, phenylenemethylene or $C_2$–$C_6$ alkylene radical, where the anthraquinone nucleus contains no further substituents or is substituted by a further sulfo group and a phenyl radical G is substituted by $C_1$–$C_4$ alkyl, $C_1$–$C_4$ alkoxy, halogen, carboxyl or sulfo, $R_1$, $R_2$, $R_3$ and $R_4$ independently of one another are hydrogen or substituted or unsubstituted $C_1$–$C_4$ alkyl, $Y_1$ and $Y_2$ independently of one another are fluorine or chlorine and n is the number 2 or 3.

2. A dye according to claim 1, in which
$R_1$, $R_2$, $R_3$ and $R_4$ independently of one another are hydrogen, methyl or ethyl.

3. A dye according to claim 1, in which the radicals $A_1$ and $A_2$ each contain at least one sulfo group.

4. A dye according to claim 1, in which
$A_1$ and $A_2$ have identical meanings.

5. A dye mixture which comprises at least two dyes according to claim 1.

6. A dye mixture according to claim 5, wherein the dyes mentioned differ only in respect of the number n.

7. A process for dyeing or printing fibre material containing hydroxyl groups or nitrogen, which process comprises the step of applying to said fibre material a tinctorial amount of a dye according to claim 1.

8. A process according to claim 7 wherein said fibre material is cellulosic fibre material or naturally occurring or synthetic polyamide fibre material.

* * * * *

UNITED STATES PATENT AND TRADEMARK OFFICE
CERTIFICATE OF CORRECTION

PATENT NO. : 5,931,975
DATED : AUGUST 3, 1999
INVENTOR(S) : BERNHARD MÜLLER ET AL

It is certified that error appears in the above-identified patent and that said Letters Patent is hereby corrected as shown below:

On the title page, item [30] should read:

-- [30] Foreign Application Priority Date

Jun. 14, 1995   [CH]   Switzerland            1766/95 --.

Signed and Sealed this

Twenty-fifth Day of April, 2000

Attest:

Attesting Officer

Q. TODD DICKINSON

Director of Patents and Trademarks